(12) United States Patent
Kawabata

(10) Patent No.: US 10,735,608 B2
(45) Date of Patent: Aug. 4, 2020

(54) MESSAGE CONVERSION SYSTEM, MESSAGE CONVERSION METHOD, AND MESSAGE CONVERSION PROGRAM

(71) Applicant: KONICA MINOLTA, INC., Chiyoda-ku, Tokyo (JP)

(72) Inventor: Hiroyuki Kawabata, Kawanishi (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 16/533,088

(22) Filed: Aug. 6, 2019

(65) Prior Publication Data
US 2020/0084329 A1 Mar. 12, 2020

(30) Foreign Application Priority Data
Sep. 11, 2018 (JP) ................. 2018-169514

(51) Int. Cl.
*G06F 3/12* (2006.01)
*H04N 1/00* (2006.01)

(52) U.S. Cl.
CPC ..... *H04N 1/00501* (2013.01); *H04N 1/00244* (2013.01); *H04N 1/00344* (2013.01); *H04N 1/00403* (2013.01); *H04N 1/00488* (2013.01); *H04N 2201/0094* (2013.01)

(58) Field of Classification Search
CPC ........... H04N 1/00501; H04N 1/00506; H04N 1/00244; H04N 1/00344; H04N 1/00403; H04N 1/00488; H04N 2201/0094
See application file for complete search history.

(56) References Cited

U.S. PATENT DOCUMENTS

2006/0103666 A1* 5/2006 Kita .................. H04N 1/00482
 345/619
2010/0033748 A1* 2/2010 Enami ................. H04N 1/0035
 358/1.13

FOREIGN PATENT DOCUMENTS

JP 2009110050 A 5/2009
JP 2016045788 A 4/2016

* cited by examiner

*Primary Examiner* — Moustapha Diaby
(74) *Attorney, Agent, or Firm* — Buchanan Ingersoll & Rooney PC

(57) ABSTRACT

A message conversion system converts a message regarding one operation screen out of an operation screen after the customization and a default screen before the customization to a message regarding the other operation screen, and includes: a first obtainer that obtains a name of the operation item and identification information of operation control; a second obtainer that obtains a name of the operation item and identification information of operation control; a creator that creates a comparison table; and a replacer that specifies the identification information corresponding to the name of the operation item included in the message regarding one operation screen, and obtains the name of the operation item of the other operation screen and replaces the name of the operation item of the one operation screen included in the message with the name of the operation item of the other operation screen.

13 Claims, 21 Drawing Sheets

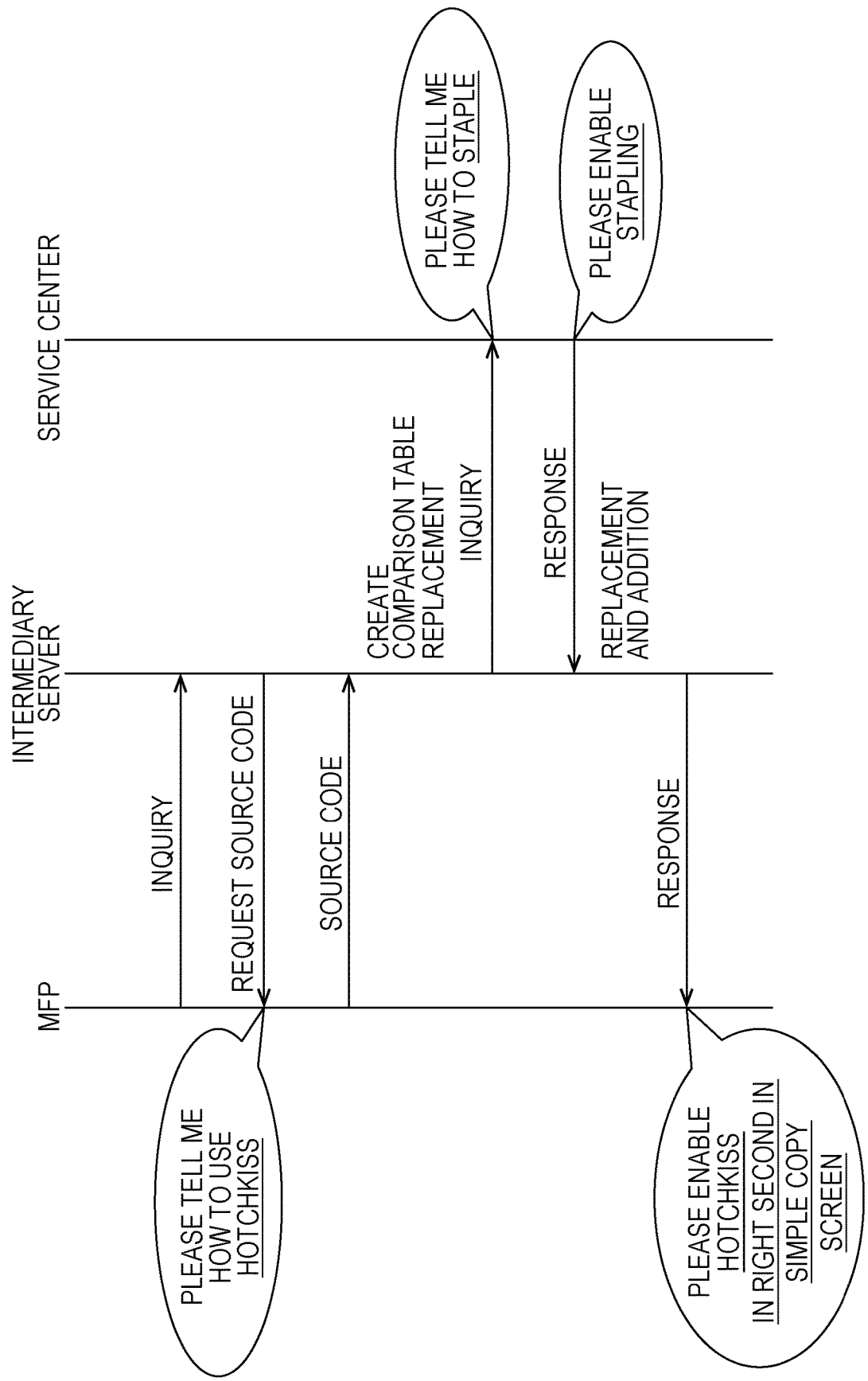

FIG. 12A

| | | | |
|---|---|---|---|
| 1201 COLOR | FULL COLOR | 1202 Nup | 2up |
| 1203 NUMBER OF COPIES | 1 | 1204 HOTCHKISS | NO |
| DETAIL... | | | START |

FIG. 12B

| | | | |
|---|---|---|---|
| DOCUMENT TYPE | TEXT | DOCUMENT SIZE | AUTOMATIC |
| FRAME ERASING | NO | PRINT SIZE | A4 |
| BLANK PAPER REMOVAL | REMOVE | PUNCHING | TWO HOLES |
| MEDIA | PLAIN PAPER | BINDING DIRECTION | LONGITUDINAL BINDING |
| | | Cancel | OK |

FIG. 13

```
<html>          ~1301
<title>[SIMPLE COPY]</title>
<head>
 <script language="javascript" type="text/javascript">
  function OnButton1Click() {
    ...
  }
  function OnButton2Click() {
    ...
  }
  function OnButton3Click() {
    ...
  }                      ~1302
  function[OnButton4Click()] {
    ...
                         } 1303
  }
 </script>
</head>
    ...     ~1304
<div id="[table]">~1305
 <div class="[row]">
  <div>[COLOR]</div>
  <div>      ~1306
   <input type="button" value="FULL COLOR" onclick="OnButton1Click();"/>
  </div>
  <div>[Nup]</div>
  <div>      ~1307
   <input type="button" value="2up" onclick="OnButton2Click();"/> <br />
  </div>
 </div>      ~1308
 <div class="[row]">
  <div>[NUMBER OF COPIES]</div>
  <div>      ~1309
   <input type="button" value="1" onclick="OnButton3Click();"/>
  </div>      ~1310
  <div>[HOTCHKISS]</div>
  <div>                                           ~1311
   <input type="button" value="NONE" onclick="[OnButton4Click()];"/><br />
  </div>
 </div>
</div>
    ...~1312
[[EOF]]
```

FIG. 14

| SCREEN NAME | UI NAME | UI POSITION | API LIBRARY FUNCTION |
|---|---|---|---|
| SIMPLE COPY | COLOR | UPPER LEFT | API_Color |
| SIMPLE COPY | Nup | UPPER RIGHT | API_Nup |
| SIMPLE COPY | NUMBER OF COPIES | LEFT SECOND | API_Copies |
| SIMPLE COPY | HOTCHKISS | RIGHT SECOND | API_Staple |
| SIMPLE COPY | START | LOWER RIGHT | API_JobStart |
| SIMPLE COPY/DETAIL | DOCUMENT TYPE | LEFT FIRST | API_OriginalType |
| SIMPLE COPY/DETAIL | FRAME ERASING | LEFT SECOND | API_EraseFrame |
| SIMPLE COPY/DETAIL | BLANK PAPER REMOVAL | LEFT THIRD | API_EjectBlankPage |
| SIMPLE COPY/DETAIL | PAPER TYPE | LEFT FOURTH | API_MediaTpye |
| SIMPLE COPY/DETAIL | DOCUMENT SIZE | RIGHT FIRST | API_OriginalSize |
| SIMPLE COPY/DETAIL | PRINT SIZE | RIGHT SECOND | API_PaperSize |
| SIMPLE COPY/DETAIL | PUNCHING | RIGHT THIRD | API_Punch |
| SIMPLE COPY/DETAIL | BINDING DIRECTION | RIGHT FOURTH | API_Direction |

FIG. 15A

| DOCUMENT SIZE | A4 | Nup | 2up |
| --- | --- | --- | --- |
| PAPER SIZE | A4 | STAPLING | NO |
| COLOR | FULL COLOR | PUNCHING | TWO HOLES |
| NUMBER OF COPIES | 1 | BINDING DIRECTION | LONGITUDINAL BINDING |

DETAIL...    Start

FIG. 15B

| DOCUMENT TYPE | TEXT |
| --- | --- |
| FRAME ERASING | NO |
| BLANK PAPER REMOVAL | REMOVE |
| MEDIA | PLAIN PAPER |

Cancel    OK

FIG. 17

| DEFAULT SCREEN | | API LIBRARY FUNCTION | CUSTOMIZED SCREEN | | |
|---|---|---|---|---|---|
| SCREEN NAME | UI NAME | | SCREEN NAME | UI NAME | UI POSITION |
| COPY | DOCUMENT SIZE | API_OriginalSize | SIMPLE COPY/DETAIL | DOCUMENT SIZE | RIGHT FIRST |
| COPY | PAPER SIZE | API_PaperSize | SIMPLE COPY/DETAIL | PRINT SIZE | RIGHT SECOND |
| COPY | COLOR | API_Color | SIMPLE COPY | COLOR | UPPER LEFT |
| COPY | NUMBER OF COPIES | API_Copies | SIMPLE COPY | NUMBER OF COPIES | LEFT SECOND |
| COPY | Nup | API_Nup | SIMPLE COPY | Nup | UPPER RIGHT |
| COPY | STAPLING | API_Staple | SIMPLE COPY | HOTCHKISS | RIGHT SECOND |
| COPY | PUNCHING | API_Punch | SIMPLE COPY/DETAIL | PUNCHING | RIGHT THIRD |
| COPY | BINDING DIRECTION | API_Direction | SIMPLE COPY/DETAIL | BINDING DIRECTION | RIGHT FOURTH |
| COPY | Start | API_JobStart | SIMPLE COPY | START | LOWER RIGHT |
| COPY/DETAIL | DOCUMENT TYPE | API_OriginalType | SIMPLE COPY/DETAIL | PAPER TYPE | LEFT FOURTH |
| COPY/DETAIL | FRAME ERASING | API_EraseFrame | SIMPLE COPY/DETAIL | FRAME ERASING | LEFT SECOND |
| COPY/DETAIL | BLANK PAPER REMOVAL | API_EjectBlankPage | SIMPLE COPY/DETAIL | BLANK PAPER REMOVAL | LEFT THIRD |
| COPY/DETAIL | MEDIA | API_MediaType | SIMPLE COPY/DETAIL | DOCUMENT TYPE | LEFT FIRST |

MESSAGE CONVERSION SYSTEM, MESSAGE CONVERSION METHOD, AND MESSAGE CONVERSION PROGRAM

The entire disclosure of Japanese patent Application No. 2018-169514, filed on Sep. 11, 2018, is incorporated herein by reference in its entirety.

BACKGROUND

Technological Field

The present invention relates to a message conversion system, a message conversion method, and a message conversion program, and especially relates to a technology of converting messages exchanged regarding a customized operation screen so as to be easily understood.

Description of the Related Art

In recent years, image forming devices of electrophotographic type are becoming multi-functional, and multi-function peripherals (MFPs) having various functions are widely spread. For this reason, a display content of an operation panel for operating the multi function peripheral is also complicated, but on the other hand, a user of the multi-function peripheral does not necessarily use all the functions evenly, and often, only some of them are used. In addition, in a case of using the multi-function peripheral in an office or the like, there are cases where it is desirable to limit the functions that may be used for the purpose of cost management and the like.

For this reason, a technology of customizing an operation screen of the multi-function peripheral is proposed (refer to, for example, JP 2016-45788 A). According to such conventional art, it is possible that the functions which are not wanted to be used by the user are not displayed on the operation panel. Therefore, even in a case where a large number of users share the multi-functional peripheral, cost management and the like may be surely performed even when all the users do not thoroughly understand whether the user may use each function.

Patent Literature 1: JP 2016-45788 A
Patent Literature 2: JP 2009-110050 A

However, if the operation screen of the multi-function peripheral is customized, there is a possibility that a method of operating the multi-function peripheral cannot be understood even when a manual created supposing a non-customized default operation screen is refereed to. In addition, since usage frequency of each function of the multi-function peripheral often varies depending on the user, there is a case that the user cannot immediately understood how to operate when using a function of low usage frequency.

In such a case, if it is possible to inquire about the operation method using a customer service of the multi-function peripheral, convenience of the user may be improved. However, if a layout of buttons and the like and names of functions and the like on the operation screen are changed as a result of customization of the operation screen, a customer engineer (CE) who receives the inquiry cannot know a display status after the customization of the operation screen, so that there is a case where contents of the inquiry from the user are hardly understood.

Also, even if the CE describes the operation method on the basis of the display status of the default operation screen. In a case where it is difficult for the user to understand contents of the description of the CE, there is a possibility that desired operation cannot be executed using the operation screen after the customization.

SUMMARY

The present invention is achieved in view of the above-described problems, and an object thereof is to provide a message conversion system, a message conversion method, and a message conversion program capable of converting messages exchanged regarding the customized operation screen so as to be easily understood.

To achieve the abovementioned object, according to an aspect of the present invention, there is provided a message conversion system in which an operation screen displayed on an operation panel of an operated device is freely customized by a user, the message conversion system converting a message regarding one operation screen out of an operation screen after the customization and a default screen before the customization to a message regarding the other operation screen, and the message conversion system reflecting one aspect of the present invention comprises: a first obtainer that obtains, for each operation item present on the default screen, a name of the operation item and identification information of operation control to be performed on an operated device main body in a case where the operation item is operated; a second obtainer that obtains from the operated device, for each operation item present on the operation screen after the customization, a name of the operation item and identification information of operation control to be performed on the operated device main body in a case where the operation item is operated; a creator that creates a comparison table in which the name of the operation item on the default screen and the name of the operation item on the operation screen after the customization are associated with each other for each identification information of the operation control on the operated device main body; and a replacer that specifies the identification information of the operation control corresponding to the name of the operation item included in the message regarding one operation screen out of the operation screen after the customization and the default screen, and obtains the name of the operation item of the other operation screen corresponding to the specified identification information with reference to the comparison table and replaces the name of the operation item of the one operation screen included in the message with the name of the operation item of the other operation screen.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 11 is a sequence diagram illustrating an operation example of the message conversion system;

FIG. 12A, is a view illustrating a simple copy screen as an example of a customized screen;

FIG. 12B is a view exemplifying a simple copy/detail screen for performing detailed settings related to the simple copy screen;

FIG. 13 is a view exemplifying a part of a source code of the simple copy screen;

FIG. 14 is a view illustrating a UI name list in which a screen name, a UI name, a UI position, and an API library function of the simple copy screen and the simple copy/detail screen are listed;

FIG. 15A is a view illustrating a copy operation screen as an example of a default screen;

FIG. 15B is a view exemplifying a copy/detail screen for performing detailed settings related to the copy operation screen;

FIG. 17 is a view exemplifying a comparison table;

DETAILED DESCRIPTION OF EMBODIMENTS

Hereinafter, one or more embodiments of a message conversion system, a message conversion method, and a message conversion program according to the present invention will be described with reference to the drawings. However, the scope of the invention is not limited to the disclosed embodiments.

[1] Configuration of Message Conversion System

First, a system configuration of a message conversion system according to this embodiment is described.

Figure 1:
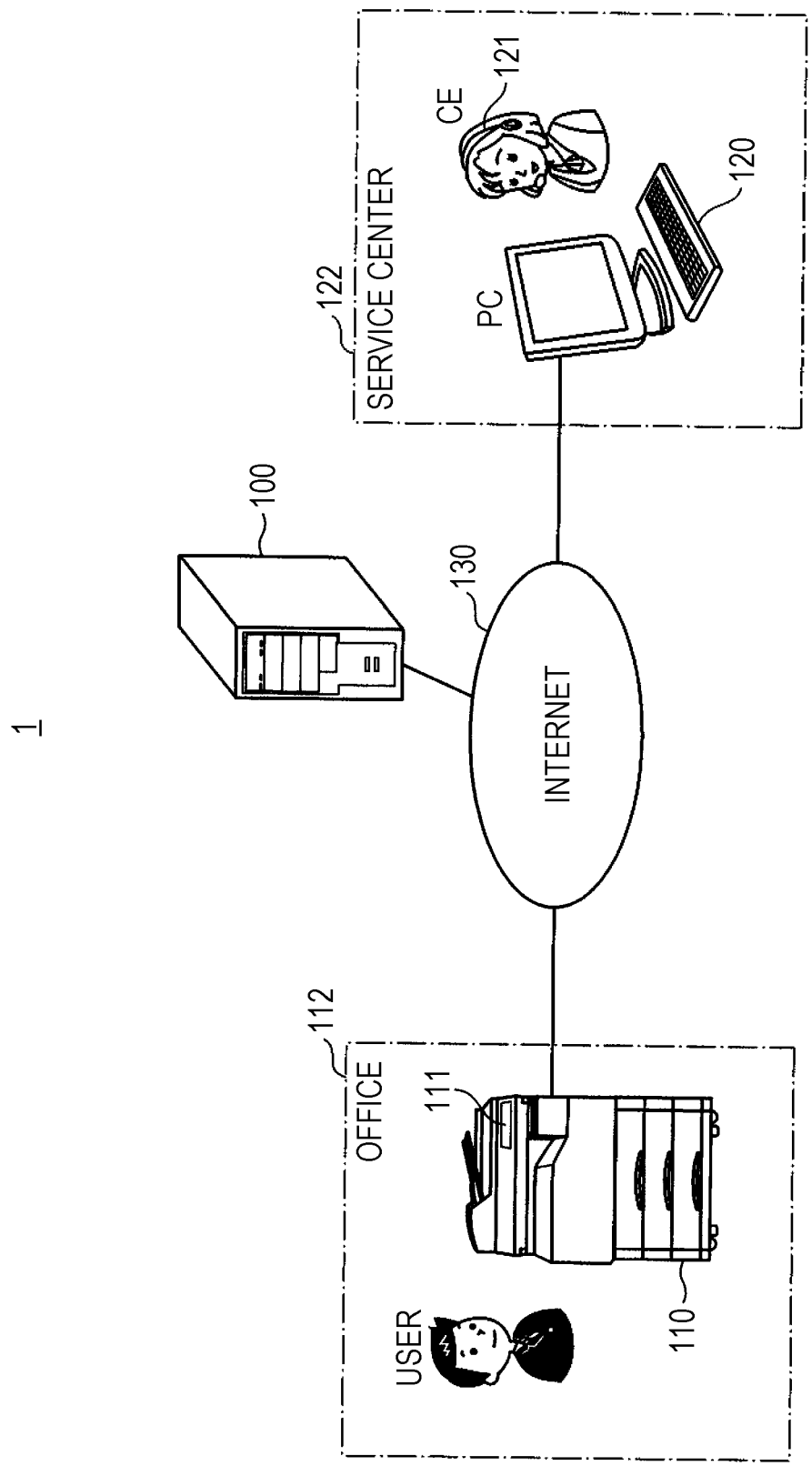
FIG. 1 is a view illustrating a system configuration of a message conversion system according to an embodiment of the present invention.

As illustrated in FIG. 1, a message conversion system 1 according to this embodiment is provided with a multi-function peripheral (MFP) 110 installed in an office 112, an intermediary server 100 connected to the Internet 130, and a personal computer (PC) 120 installed in a service center 122, and the multi-function peripheral 110 and the PC 120 are also connected to the Internet 130.

The multi-function peripheral 110 is provided with an operation panel 111. The operation panel 111 is provided with a touch panel including a liquid crystal display (LCD) and a touch pad and presents information to a user or accepts an instruction input from the user. An operation screen displayed on the liquid crystal display of the operation panel 111 may be customized by the user.

The operation panel 111 is provided with a hard key, a microphone, and a speaker in addition to the touch panel, and it is possible to accept an audio instruction from the user by using the microphone, and perform an audio output to the user using the speaker. Also, one of the hard keys is an audio guide key. When the user presses the audio guide key, an audio customer service may be received from the service center 122.

A headset 121 is connected to the PC 120 of the service center 122. The headset 121 is provided with a speaker and a microphone, and a customer engineer (CE) of the service center 122 may provide an audio customer service to the user of the multi-function peripheral 110 by wearing the headset 121.

[2] Message Conversion Procedure

Next, a message conversion procedure of the message conversion system 1 is described.

Figure 2:
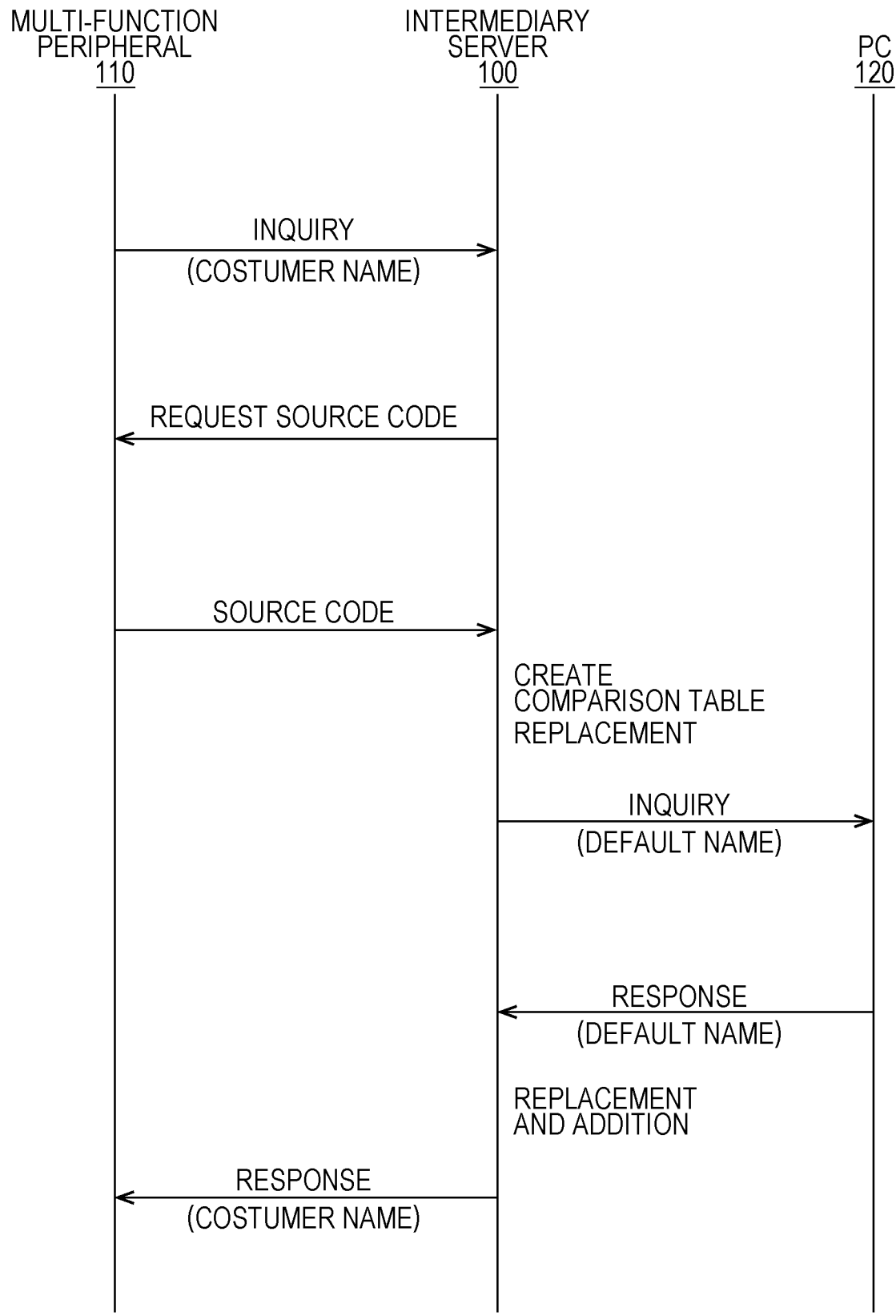
FIG. 2 is a sequence diagram for explaining typical operation of the message conversion system.

As illustrated in FIG. 2, when the audio guide key is pressed and the multi-function peripheral 110 accepts an audio inquiry from the user, this transmits audio data of the inquiry to the intermediary server 100. The operation screen displayed on the liquid crystal display of the operation panel 111 of the multi-function peripheral 110 is customized by the user, and the audio inquiry might include a name (customer name) displayed on the operation screen after customization (hereinafter referred to as a "customized screen").

The intermediary server 100 which receives the inquiry requests a source code for displaying the operation screen on the liquid crystal display of the operation panel 111 from the multi-function peripheral 110. In this embodiment, the source code is described in HyperText Markup Language (HTML), but this may also be described in another language. In response to the request from the intermediary server 100, the multi-function peripheral 110 transmits the source code of the operation screen customized by the user to the intermediary server 100.

When the intermediary server 100 accepts the source code from the multi-function peripheral 110, this examines contents of the source code and creates a comparison table to compare a name (hereinafter, referred to as a "default name") in a default operation screen (hereinafter referred to as a "default screen") and a name in the customized screen (hereinafter referred to as a "customized mime") for each user interface (UI).

Next, the intermediary server 100 replaces a UI name in the inquiry received from the multi-function peripheral 110 with a UI name in the default screen corresponding to the UI name in the comparison table, and transmits the inquiry audio data after the replacement to the PC 120. When accepting the inquiry audio data after the replacement, the PC 120 reproduces and outputs the audio using the speaker of the headset 121 and allows the CE of the service center 122 to listen to the same.

Prior to the reproduction output, the PC 120 may notify the CE that the inquiry audio data is received by a screen display or an audio output, and the CE who receives the notification may instruct the reproduction of the inquiry audio.

Thereafter, when the PC 120 accepts a response from the CE by an audio input, this transmits audio data of the response to the intermediary server 100. Since the CE cannot know the UI name in the customized screen on the user side, the UI name in the default screen is used in the response audio.

When receiving the response audio data, the intermediary server 100 refers to the comparison table and replaces the UI name in the default screen used in the response audio with the UI name in the customized screen. The intermediary server 100 further adds display position information of the UI to the UI name in the customized screen, and transmits the response audio data after the replacement and addition to the multi-function peripheral 110.

When receiving the response audio data, the multi-function peripheral 110 reproduces and outputs the response audio using the speaker of the operation panel 111.

By doing so, even when the operation screen of the multi-function peripheral 110 is customized, it is possible to generate an operation instruction for performing user operation by using the customized screen to notify the user of the same in response to the inquiry from the user.

[3] Configuration and Operation of Multi-Function Peripheral 110

Next, a configuration and operation of the multi-function peripheral 110 are described.

(3-1) Configuration of Multi-Function Peripheral 110

Figure 3:
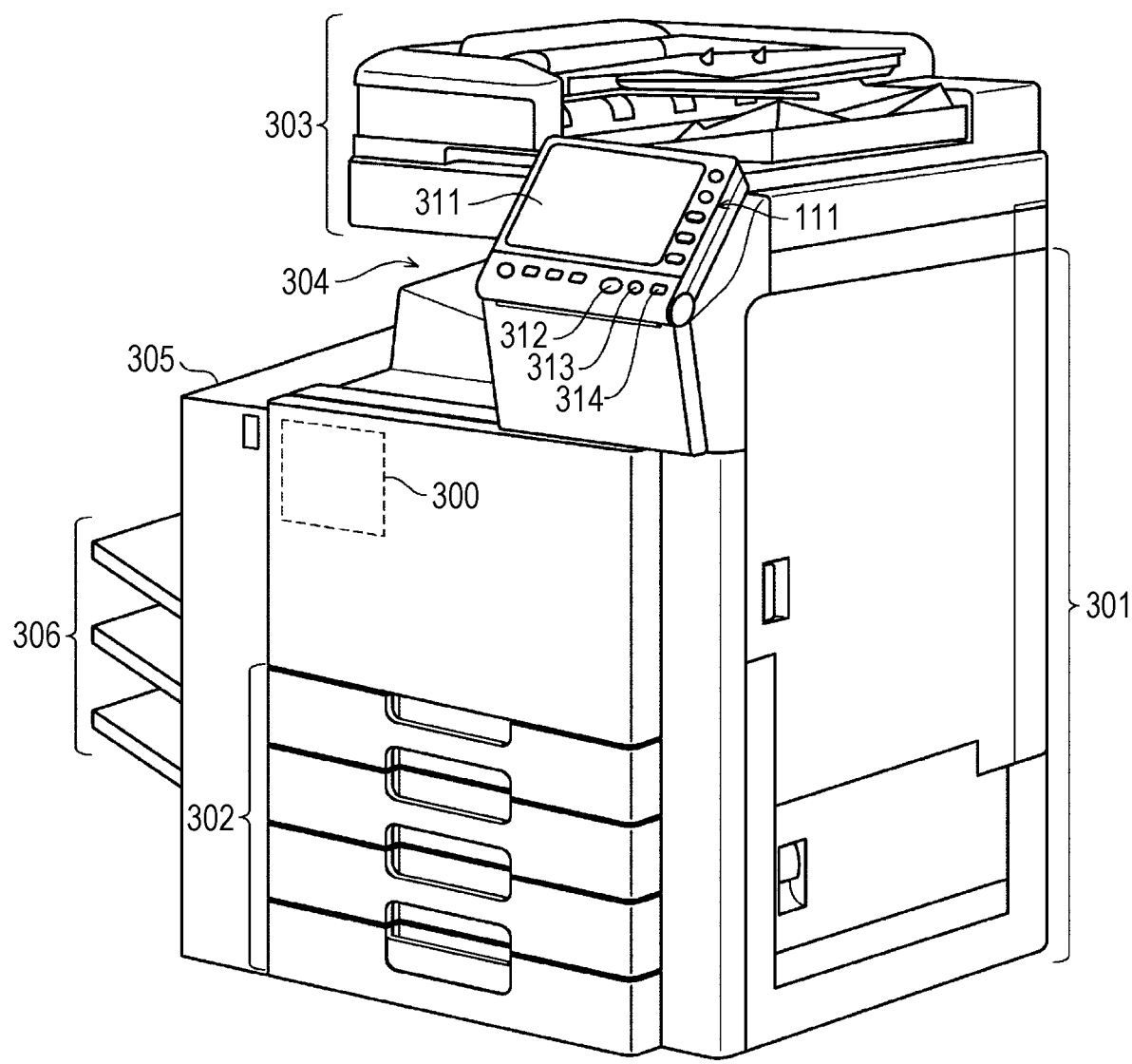
FIG. 3 is an external perspective view illustrating a principal configuration of a multi-function peripheral.

As illustrated in FIG. 3, the multi-function peripheral 110 is provided with an image forming unit 301, a paper feeding unit 302, an image reading unit 303, the operation panel 111, a post-processing unit 306 and the like, and executes processes such as an image forming process, a copying process, and facsimile transmitting/receiving process. A control unit 300, an image forming unit, and a fixing unit (later two are not illustrated) are mounted on the image forming unit 301, and the control unit 300 is connected to the Internet 130 and a facsimile line (not illustrated).

The operation panel 111 is provided with a touch panel 311 including a liquid crystal display (LCD) and a touch pad, a speaker 312, a microphone 313, and an audio guide key 314, and provides information to the user of the multi-function peripheral 110, accepts a touch input and a key input by the user, and reminds the user by ringing a warning sound.

In a case where the user of the multi-function peripheral 110 operates the operation panel 111 to instruct the multi-function peripheral 110 to perform the image forming process, or accepts a print job from another device by the control unit 300, the image forming unit 30/ forms a monochrome or color toner image by the image forming unit.

When the paper feeding unit 302 supplies a recording sheet in parallel to the formation of the toner image, the image forming unit 301 transfers the toner image to the recording sheet, and then thermally fixes the toner image to the recording sheet by the fixing unit. In a case of double-sided printing, the recording sheet is conveyed to a paper refeeding path, front and back sides thereof are reversed, and the toner image is transferred to the back side of the recording sheet to be thermally fixed. The recording sheet the thermal fixing of the toner image to which is completed, is discharged to a paper discharge tray 305 provided in an inner space in a case where the post-process is not performed.

In a case where the post-process is performed, the image forming unit 301 discharges the recording sheet to the post-processing unit 306. The post-processing unit 306 applies the post-process such as folding, punching, binding, cuffing, inserting, stapling, and stacking to the recording sheet, and then discharges the sheet to a paper discharge tray 307 provided so as to project from a side surface of the post-processing unit 306. The paper discharge tray 307 includes a plurality of trays.

When executing a document reading process, a copying process, a facsimile transmitting process and the like, the image reading unit 303 reads a color document or a monochrome document to generate image data. The image reading unit 303 may read the document placed on a platen glass according to a platen setting method, or read a single side or both sides of the document while conveying the document with an automatic document feeder (ADF) according to a sheet through method.

In a case of the copying process, the image forming unit 301 executes image formation using the read image data. In a case of the facsimile transmitting process, the read image data is transmitted by facsimile at resolution negotiated with a transmission destination facsimile device. The control unit 300 may also receive facsimile data via the facsimile line.

Note that the paper feeding unit 302 is provided with a plurality of paper feed trays, and the recording sheet is supplied from the paper feed tray designated by the user or a priority paper feed tray in a case where the user does not designate the paper feed tray.

(3-2) Configuration of Control Unit 300

Next, a configuration and operation of the control unit 300 are described.

Figure 4:
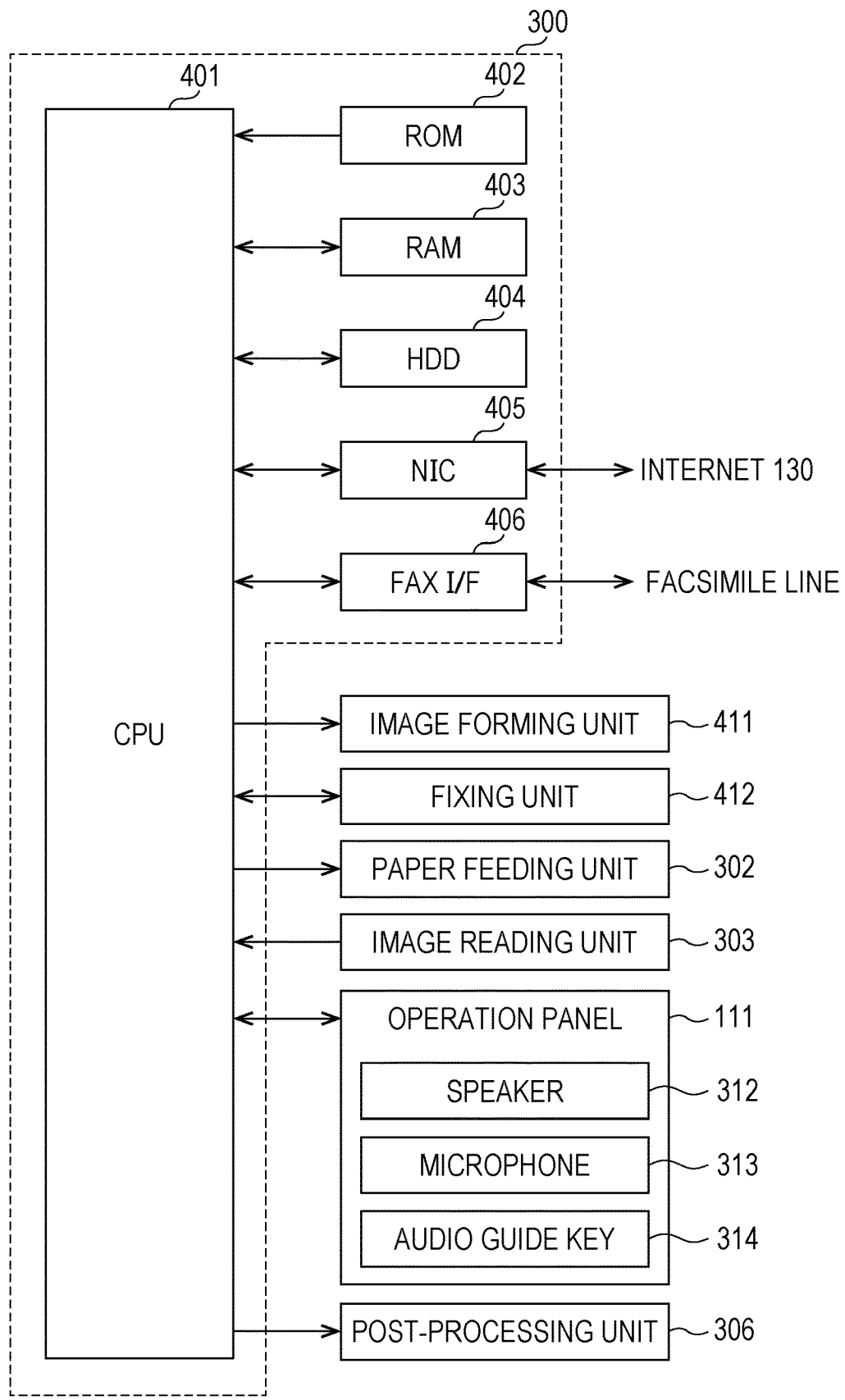
FIG. 4 is a block diagram illustrating a principal configuration of a control unit.

As illustrated in FIG. 4, the control unit 300 is provided with a central processing unit (CPU) 401, a read only memory (ROM) 402, a random access memory (RAM) 403 and the like, and when the multi-function peripheral 110 is powered on, the CPU 401 reads a boot program from the ROM 402 and activates the RAM 103 as a working storage area. Thereafter, the CPU 401 reads an OS and a control program from a hard disk drive (HDD) 404 and executes them.

A network interface card (NIC) 405 executes a communicating process for the CPU 401 to access the intermediary server 100 via the Internet 130. A fax interface 406 executes transmission and reception of the facsimile data via the facsimile line.

When executing the image forming process, the CPU 401 controls the image forming unit 411 to form the monochrome or color toner image, and thermally fixes the toner image to the recording sheet while controlling temperature of the fixing unit 412. Also, the CPU 401 controls the paper feeding unit 502 to feed the recording sheet designated by the user.

The CPU 401 displays information to the user and accepts an instruction input from the user by using the operation panel 504. Furthermore, the CPU 401 controls the post-processing unit 506 to apply the post-process such as folding, punching, binding, cutting, inserting, stapling, and stacking on the recording sheet, and discharges the sheet onto a paper discharge tray 507.

(3-3) Operation of Control Unit 300

Figure 5:
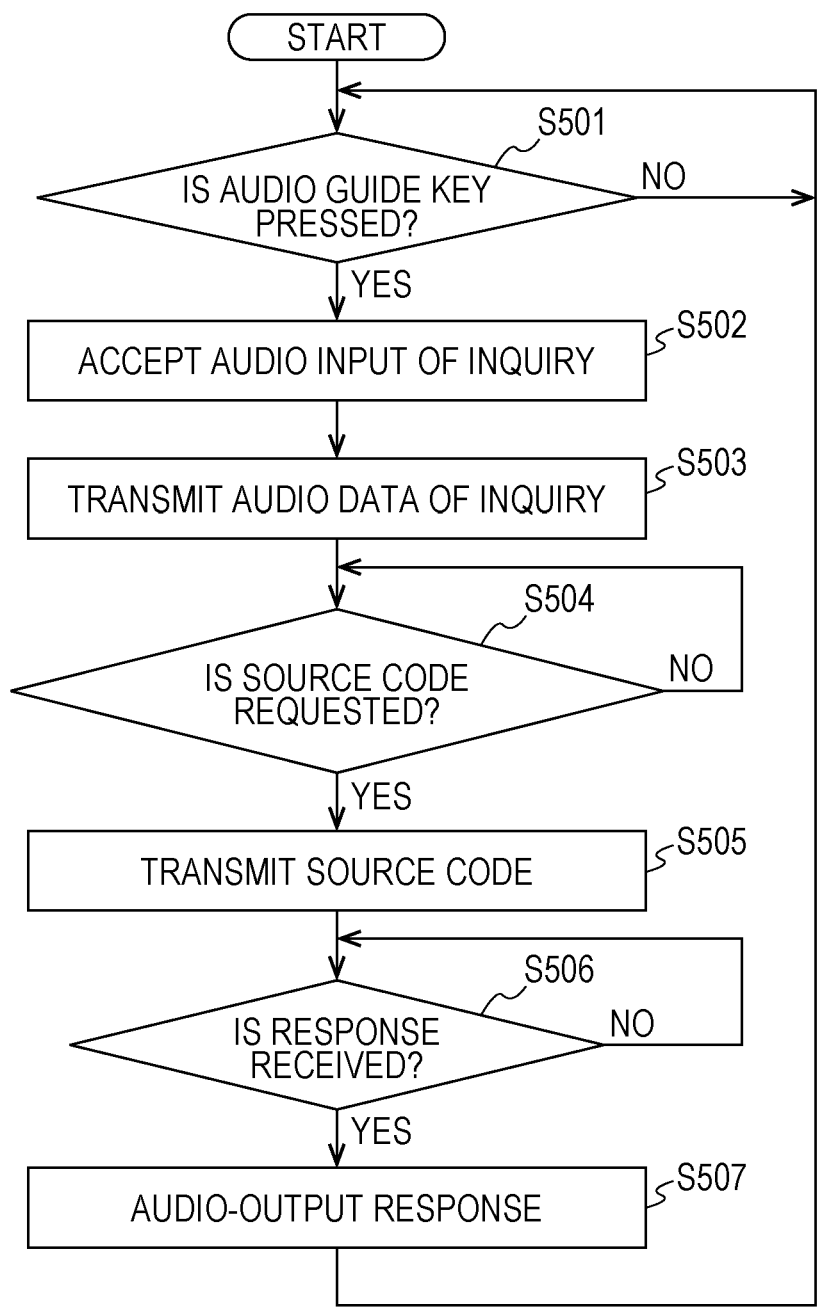
FIG. 5 is a flowchart illustrating principal operation of the control unit regarding transmission of an inquiry.

As illustrated in FIG. 5, when the audio guide key 314 is pressed (S501: YES), the control unit 300 accepts the audio input of the inquiry from the user with the microphone 313 (S502), and transmits the audio data of the accepted inquiry to the intermediary server 100 via the Internet 130 (S503). The user of the multi-function peripheral 110 may make the inquiry using the UI name displayed on the customized screen.

Thereafter, when the request of the source code from the intermediary server 100 is accepted (S504: YES), the customized source code is transmitted to the intermediary server 100 in response to the processing request (S505). At that time, in addition to the source code, identification information for identifying a model of the multi-function peripheral 110 is transmitted to the intermediate server.

Furthermore, when the audio data of the response is received from the intermediary server 100 (S506: YES), the response is audio-output by the speaker 312 (S507). Since the UI name displayed on the customized screen is used in the response, it is convenient for the user of the multi-function peripheral 110 to perform the operation using the customized screen.

[4] Configuration and Operation of Intermediary Server 100

Next, a configuration and operation of the intermediary server 100 are described.

(4-1) Configuration of Intermediary Server 100

Next, a configuration and operation of the intermediary server 100 are described.

Figure 6:
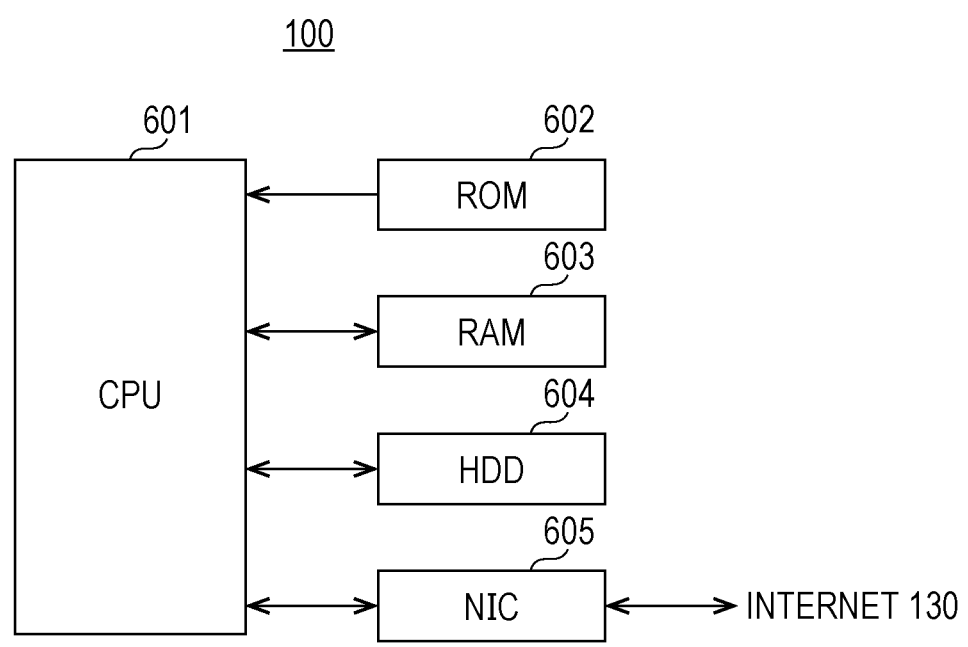
FIG. 6 is a block diagram illustrating a principal configuration of an intermediary server.

As illustrated in FIG. 6, the intermediary server 100 is provided with a central processing unit (CPU) 601, a read only memory (ROM) 602, a random access memory (RAM) 603 and the like, and when the power is turned on, the CPU 601 reads a boot program from the ROM 602 and activates the RAM 603 as a working storage area. Thereafter, the CPU 601 reads an OS and a control program from a hard disk drive (HDD) 604 and executes them.

A network interface card (NIC) 605 executes a communicating process for the CPU 601 to access the multi-function peripheral 110 and the PC 120 via the Internet 130. The HDD 604 stores in advance a list in which a name of the default screen and the UI name displayed on the default screen are associated with an onclick element or an API library function for each model of the multi-function peripheral 110.

(4-2) Operation of Intermediary Server 100

Figure 7:
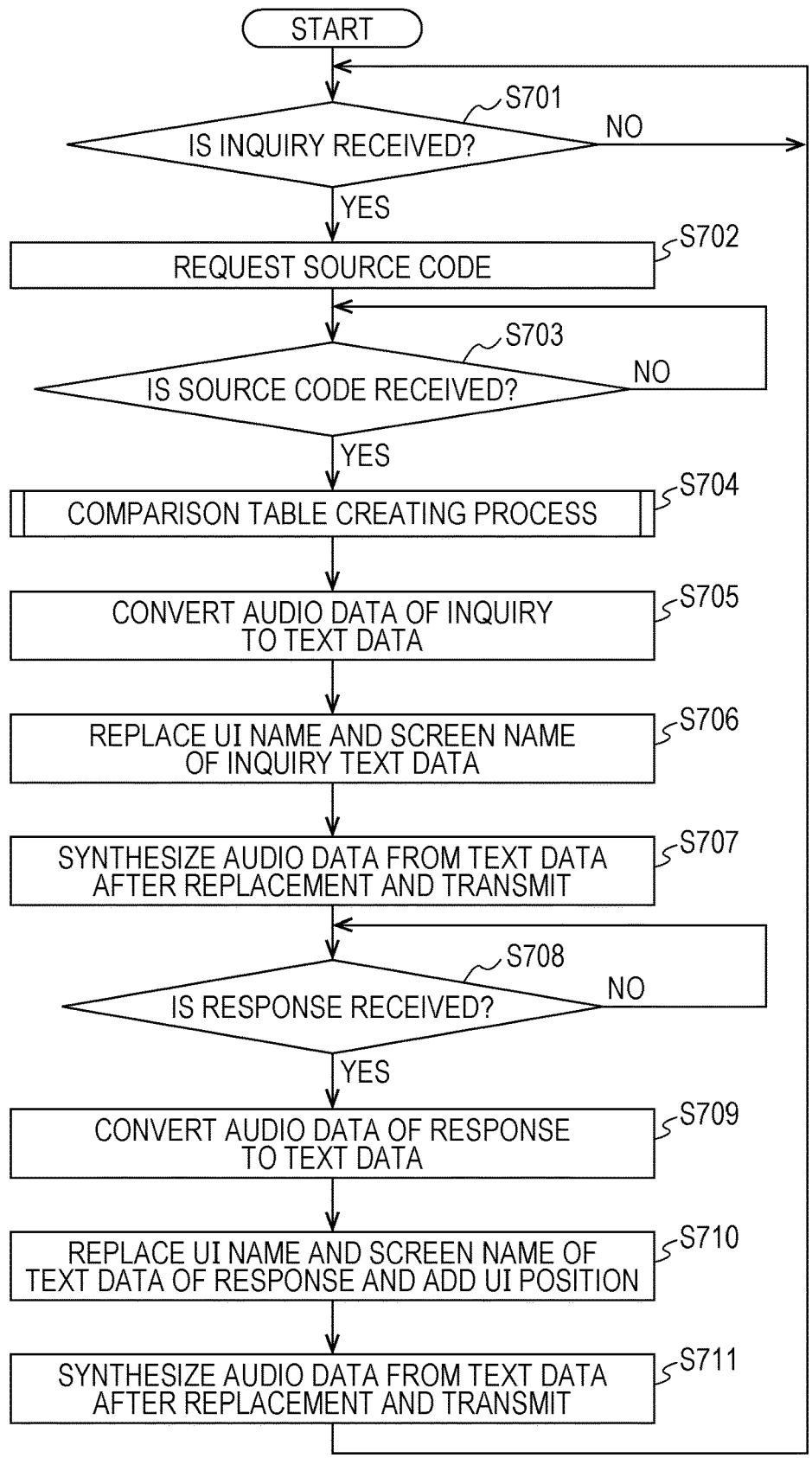
FIG. 7 is a flowchart illustrating principal operation of the intermediary server.

As illustrated in FIG. 7, when the intermediary server 100 receives the inquiry audio data from the multi-function peripheral 110 (S701: YES), this requests the source code for displaying the customized screen on the operation panel 111 of the multi-function peripheral 110 for replacing the UI name in the customized screen included in the inquiry audio with the UI name in the default screen (S702). The source code is described in HTML in this embodiment, but this may also be described in another language.

When the source code is received from the multi-function peripheral 110 (S703: YES), the intermediary server 100 executes a comparison table creating process of analyzing the source code as described later to create the comparison table (S704). Also, using an audio recognizing technology, the intermediary server 100 converts the audio data of the inquiry (inquiry message) to text data (S705), segments the text data into respective words and extracts a noun.

Then, it is checked whether the extracted noun is described in the comparison table as the UI name or screen name of the customized screen, and in a case where this is described, the noun is replaced with the UI name or the screen name of the default screen corresponding to the UI name or the screen name of the customized screen (S706). The intermediary server 100 synthesizes audio data from the text data after the replacement (inquiry message after the replacement), and transmits the same to the PC 120 (S707).

When the audio data of the response is received from the PC 120 (S708: YES), the intermediary server 100 converts the audio data of the response (response message) to text data using the audio recognizing technology (S709). Then, the UI name and the screen name of the default screen included in the text data are replaced with the UI name and the screen name of the customized screen, respectively, using the comparison table as in the above-described manner, and a position of the 151 is added to the UI name (S710).

For example, in a case where the response text data is "stapling of copy", and "copy" corresponds to "simple copy" as the screen name, "stapling" corresponds to "Hotchkiss" as the UI name, and the UI position corresponding to "Hotchkiss" is "right second" in the comparison table, the UI name and the screen name are replaced and the UI position is added as "Hotchkiss in right second of simple copy".

The intermediary server 100 finally synthesizes audio data from the text data after the replacement and addition (response message after the replacement and addition) using the audio synthesizing technology, and transmits the synthesized audio data to the multi-function peripheral 110 (S711).

(4-3) Comparison Table Creating Process

The comparison table creating process executed by the intermediary server 100 is described.

Figure 8:
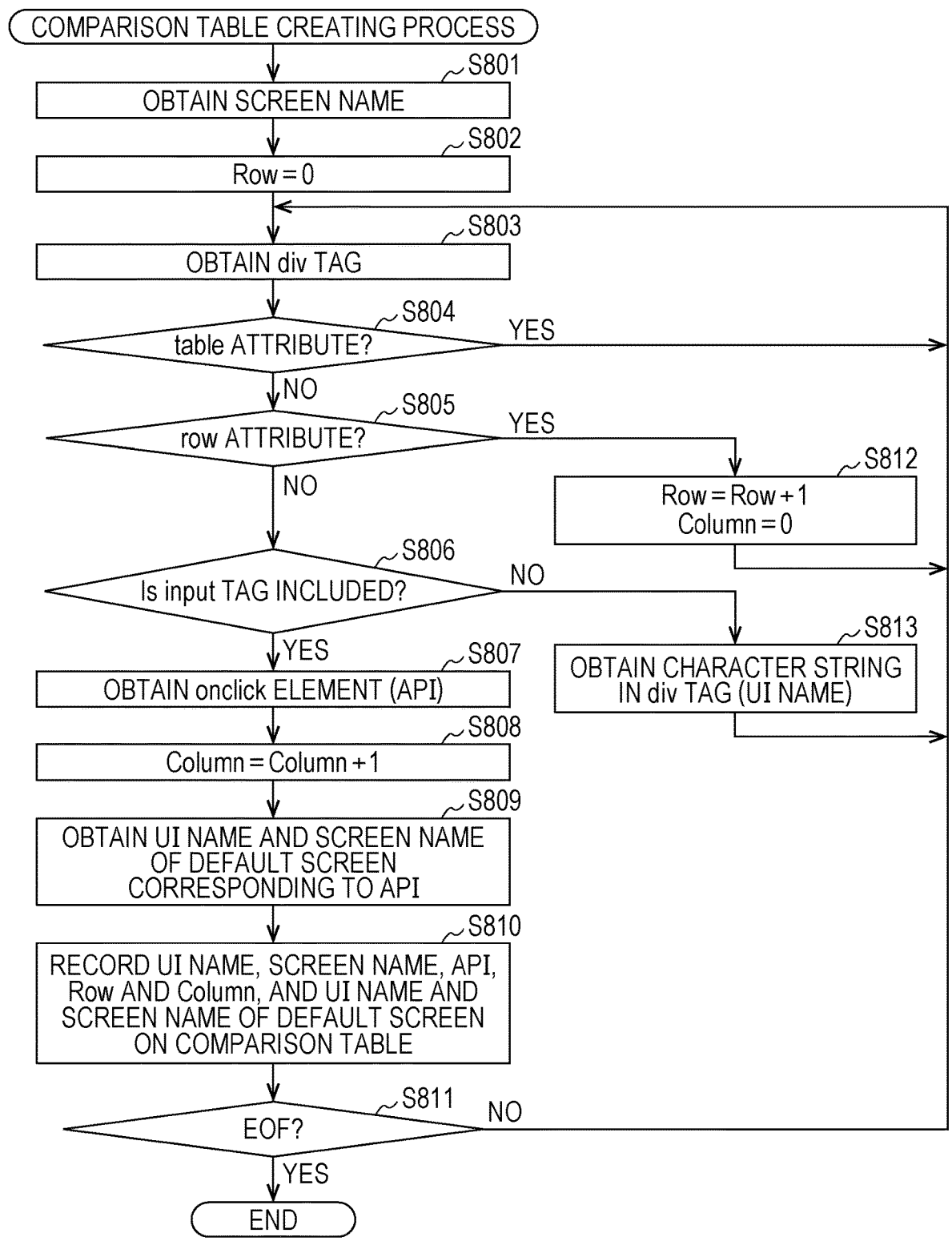
FIG. 8 is a flowchart for explaining a comparison table creating process by the intermediary server.

In the comparison table creating process, as illustrated in FIG. 8, tire intermediary server 100 refers to the source code to obtain the screen name (S801). In this embodiment, the screen name is designated using a <title> tag in the source code, and the screen name is specified by detecting the <title> tag. Next, a value of a work variable Row indicating the UI position in a vertical direction on the operation screen is initialized to 0 (S802).

Then, the source code is searched sequentially from the top, and a <div> tag is obtained (S803). In a case where the obtained <div> tag has a table attribute (S804: YES), the procedure shifts to step S803. In a case were the attribute of the obtained <div> tag is row, in other words, when class of the <div> tag is "row" (S805: YES), it is determined that a new row of the UI positions arranged in a lattice pattern in the table is started, and the value of the work variable Row is incremented by one and a value of a work variable Column indicating the UI position in a horizontal direction is set to 0 (S812), then the procedure shifts to step S803.

In a case where the obtained <div> tag does not include an <input> tag (S806: NO), a character string included, in the <div> tag is obtained as the UI name (S813). On the other hand, in a case where the obtained <div> tag includes the <input> tag (S806: YES), tire onclick element is obtained (S807). Note that, in a case where the onclick element is defined using JavaScript (registered trademark) at the beginning of the source code, a name of the API library function described in the definition of the onclick element may be obtained in place of the onclick element.

Thereafter, the value of the work variable Column is incremented by one (S808), and the UI name and the screen name of the default screen corresponding to the onclick element or the name of the API library function obtained at step S808 are obtained with reference to the list regarding the default screen (S809). Then, the UI name, the screen name, the onclick element, and display position information of the UI (values of work variables Row and Column) of the customized screen, and the UI name and the screen name of the default screen are recorded in the comparison table (S810).

Furthermore, with reference to the source code, if it reaches End of File (EOF) (S811: YES), the comparison table creating process is finished. If it does not reach EOF (S811: NO), the procedure shifts to step S803.

[5] Configuration and Operation of PC 120

Next, the configuration and operation of the PC 120 is described.

(5-1) Configuration of PC 120

Next, the configuration of the PC 120 is described.

Figure 9:
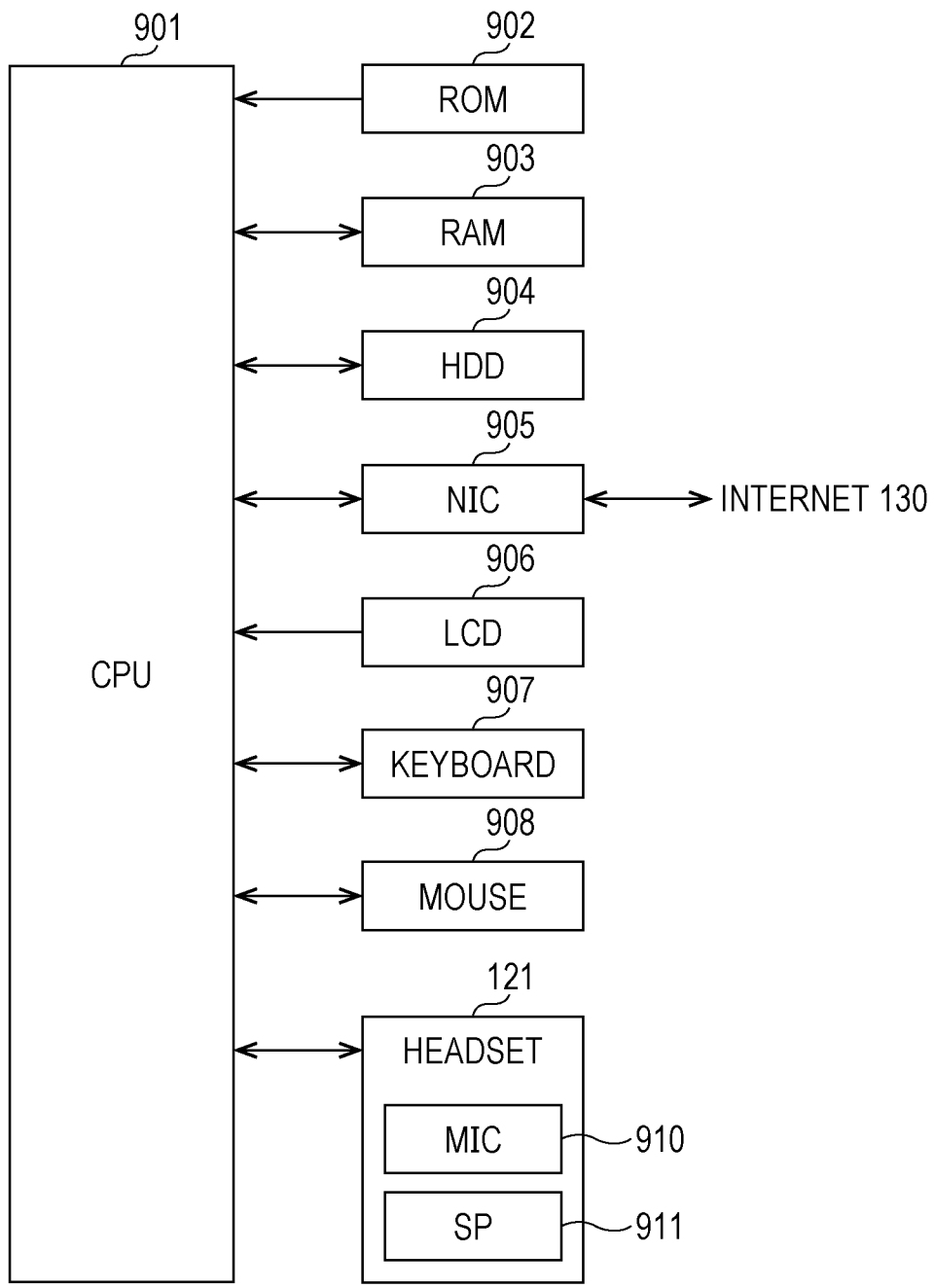
FIG. 9 is a block diagram illustrating a principal configuration of a PC.

As illustrated in FIG. 9, the PC 120 is provided with a central processing unit (CPU) 901, a read only memory (ROM) 902, a random access memory (RAM) 903 and the like, and when the power is turned on, the CPU 901 reads a boot program from the ROM 902 and activates the RAM 903 as a working storage area. Thereafter, the CPU 901 reads an OS and a control program from a hard disk drive (HDD) 904 and executes them.

A network interface card (NIC) 905 executes a communicating process for the CPU 901 to access the intermediary server 100 via the Internet 130. A liquid crystal display 906 is used for notifying the CE of arrival of the inquiry, and a keyboard 907 and a mouse 908 for presenting information are used by the CE to input the information to the PC 120 and indicate the processes.

The headset 121 is provided with a microphone 910 and a speaker 911, and is used to audio-output the inquiry using the speaker 911 and to audio-input the response using the microphone 901.

(5-2) Operation of PC 120

Figure 10:
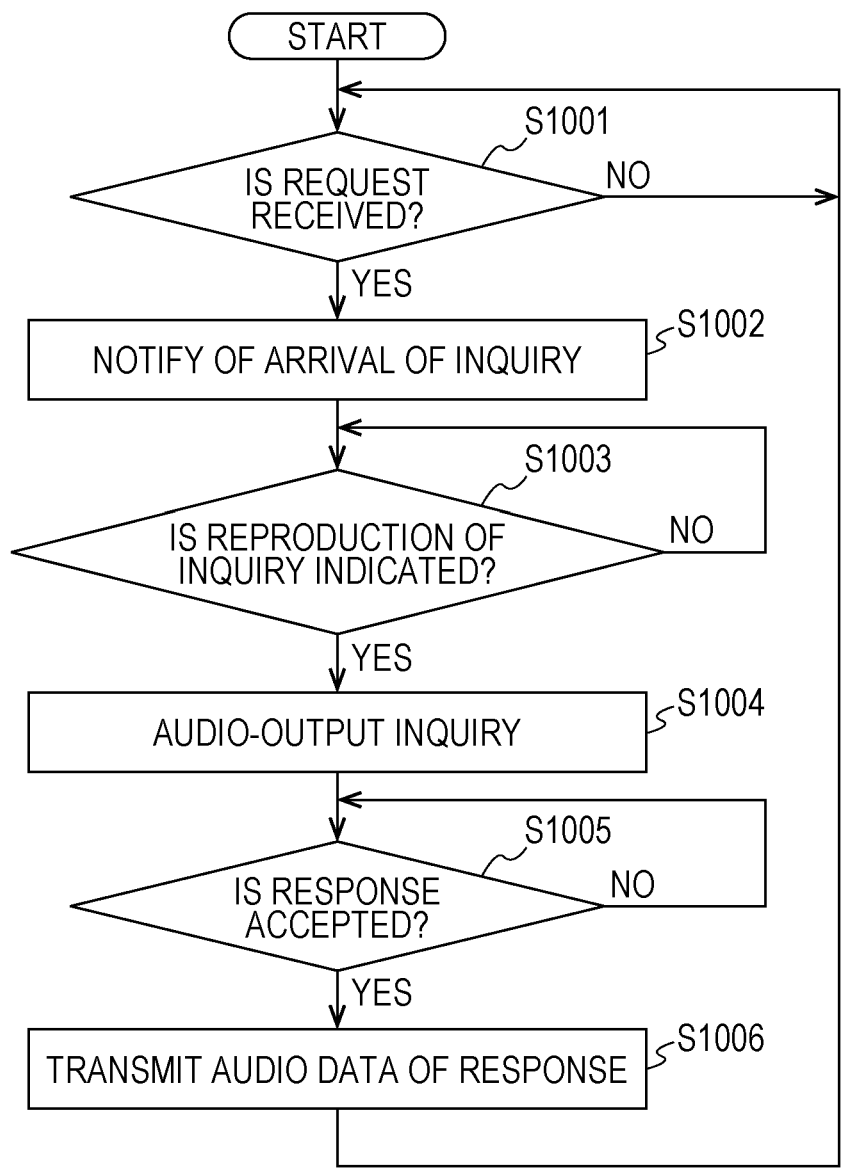
FIG. 10 is a flowchart illustrating principal operation of the PC.

As illustrated in FIG. 10, when the PC 120 receives the inquiry audio data from the intermediary server 100 (S1001: YES), this displays a screen on the liquid crystal display 906 or outputs a ring from the speaker 911 to notify of the arrival of the inquiry (S1002). In contrast, when the CE instructs the PC 120 to reproduce the inquiry audio (S1003: YES), the PC 120 reproduces the inquiry audio using the speaker 911 (S1004).

Thereafter, when the PC 120 accepts the audio input of the inquiry from the CE (S1005: YES), this transmits the audio data of the response to the intermediary server 100 (S1006).

[6] Operation Example

Next, operation of the message conversion system 1 according to this embodiment is described by taking an example.

(6-1) Outline of Operation

In this operation example, as illustrated in FIG. 11, when the user of the multi-function peripheral 110 first presses the audio guide key 314 and audio-inputs the inquiry of "Tell me how to use Hotchkiss.", the multi-function peripheral 110 transmits the audio data to the intermediary server 100.

When the audio data includes the UI name and the screen name of the customized screen, the intermediary server 100 replaces them with the UI name and the screen name of the default screen. In this operation example, "Hotchkiss" which is the UI name in the customized screen is replaced with "stapling" which is the UI name in the default screen. By this replacement, the inquiry audio is changed from "Tell me how to use Hotchkiss." to "Tell me how to stapling." The intermediary server 100 transmits the inquiry audio data after the replacement to the PC 120 of the service center 122.

The PC 120 of the service center 122 reproduces the received inquiry audio and allows the CE to listen to the same, then accepts the audio input of the response from the CE. In this operation example, the response audio is "Please enable stapling." When the PC 120 accepts the response audio, this transmits the audio data to the intermediary server 100.

When the intermediary server 100 receives the audio data, of the response from the PC 120, this replaces the UI name and the screen name of the default screen included in the audio data with the UI name and the screen imine of the customized screen and adds the display position information in the UI to the UI name of the customized screen. As a result, "Please enable stapling." is changed to "Please enable Hotchkiss in right second of simple copy screen." The intermediary server 100 transmits the audio data of the response after the replacement and addition to the multi-function peripheral 110.

(6-2) Customized Screen

The customized screen according to this operation example is, as illustrated in FIG. 12A, an operation screen for performing copy operation the screen name of which is "simple copy". The UI name of UI 1201 in a first row and a first column of the "simple copy" screen is "color", and the UI name of UI 1202 in a second column is "Nup". The UI name of UI 1203 in a second row and a first column is "number of copies", the UI name of UI 1204 of a second column is "Hotchkiss", and it is possible to perform setting for each item.

A "detail" button is provided in a left side part of a third row, and when the "detail" button is touched, a "simple copy/detail" screen is displayed. Also, a "start" button is provided on a right side part, and when the "start" button is touched, the multi-function peripheral 110 starts the copy operation.

The "simple copy/detail" screen is a screen for performing detailed setting regarding the "simple copy" screen, as illustrated in FIG. 12B. On the "simple copy/detail" screen, the UI mines such as "document type", "document size", "frame erasing", "print size", "blank paper removal", "punching", "media", "binding direction" and the like are displayed, and it is possible to perform the setting for each item.

In addition, a "cancel" button and an "OK" button are arranged in lower right of the "simple copy; detail" screen. When the "cancel" button is touched, the settings performed for the respective items of the operation screen after the "simple copy/detail" screen is displayed are invalidated, and the screen is returned to the "simple copy" screen. On the other hand, when the "OK" button is touched, the settings performed for the respective items of the operation screen after the "simple copy/detail" screen is displayed are validated, and the screen is returned to the "simple copy" screen.

In the source code for displaying the customized screen "simple copy", as illustrated in FIG. 13, "simple copy" which is a screen name 1301 is described using the <title> tag. Subsequently, the onclick element such as OnButton1Click ( ) is defined using JavaScript (registered trademark) in a <script> tag in a <head> tag. Although not illustrated, the API library function of the multi-function peripheral 110 is used in this definition.

Furthermore, it is declared that this is a table without ruled lines by using a <div> tag 1304 below, it is further declared that the UIs are arranged in one row by using a <div> tag 1305, and after that, "color" which is a UI name 1306 of the first UI is described. Similarly, UI names 1307, 1309, and 1310 are "Nup", "number of copies", and "Hotchkiss", respectively.

Note that, since a new row is declared by a <div> tag 1308 between the UI names 1307 and 1309, the UI names 1306 and 1307 and the UI names 1309 and 1310 are arranged in different rows.

In an <input> tag corresponding to "Hotchkiss" of the UI name 1310, OnButton4Click ( ) is described as an onclick element 1311. Also, contents of the OnButton4Click ( ) are defined in <script> tag above, and the API library function corresponding to the UI name 1310 may be specified with reference to time definition.

The end of the source code is EOF 1312.

FIG. 14 is a UI list created on the basis of the source code of the "simple copy" screen illustrated in FIG. 13 and the source code (not illustrated) of the "simple copy/detail"

screen. In the UI list, for each API, the screen name, the UI name, and the UI position corresponding to the API are recorded. For example, the UI displayed in "right second" of the "simple copy" screen the UI name of which is "Hotchkiss" is recorded in association with the API library function "API_Staple".

Note that an onclick element field may be provided in place of the API field to record the name of the onclick element. In this case, for example, in place of the API library function "API_Staple" corresponding to the UI name "Hotchkiss", the name "OnButton4Click" of the onclick element is recorded.

(6-3) Default Screen

As an example of the default screen FIG. 15A illustrates a "copy" screen on which the UI name "stapling" corresponding to the API library function "API_Staple" is displayed. On the "Copy" screen, the UI names such as "document size", "Nup", "paper size", "stapling", "color", "punching", "number of copies", and "binding direction" are displayed, and the setting may be performed for each item. Also, in lower left of the "copy" screen, a "detail" button is provided for displaying a "copy/detail" screen which is the default screen for performing detailed settings on the "copy" screen. Also, a "start" button is a button for allowing the multi-function peripheral 110 to start copying.

As illustrated in FIG. 15B, on the "copy/detail" screen, the UI names such as "document type", "frame erasing", "blank paper removal", and "media" are displayed, and setting for each item may be performed. The "cancel" button is a button which invalidates the settings performed for the respective items of the operation screen after the "simple copy/detail" screen is displayed and returns to the "simple copy" screen. The "OK" button is a button which validates the settings performed for the respective items of the operation screen after the "simple copy/detail" screen is displayed and returns to the "simple copy" screen.

Figure 16:
FIG. 16 is a view illustrating a UI name list in which a screen name, a UI name, and an API library function of the copy operation screen and the copy/detail screen are listed.

FIG. 16 illustrates a UI list regarding the default screens "copy" and "copy/detail". In the II list in FIG. 16, for example, "stapling" and "copy" are recorded as the UI name and the screen name corresponding to the API library function "API_Staple".

(6-4) Comparison Table

The comparison table is, as illustrated in FIG. 17, a table which associates the UI of the default screen and the UI of the customized screen with the API library function as a key. A "default screen" field includes two fields of "screen name" and "UI name", a "customized screen" field includes three fields of "screen name", "UI name", and "UI position"; in any field, the screen name, the UI name, and the UI position corresponding to the API library function described in the "API library function" field are recorded.

For example, in a case where the "API library function" field is "API_Staple", the "screen name" field and the "UI name" field of the "default screen" field are "copy" and "stapling", respectively. Also, the "screen name" field, the "UI name" field, and the "UI position" field in the "customized screen" field are "simple copy", "Hotchkiss", and "right second", respectively.

When such comparison table is used, for example, when the inquiry text before the replacement is "Hotchkiss", "Hotchkiss" in the inquiry text may be replaced with the "stapling" with reference to the "UI name" field in the "default screen" field corresponding to "Hotchkiss" in the "UI name" field of the "customized screen" field.

On the other hand, when the response text before the replacement is "stapling", "stapling" in the response text may be replaced with "Hotchkiss" with reference to the "UI name" field of the "customized screen" field corresponding to "stapling" of the "UI name" field of the "default screen" field.

(6-5) Another Operation Example

Figure 18:
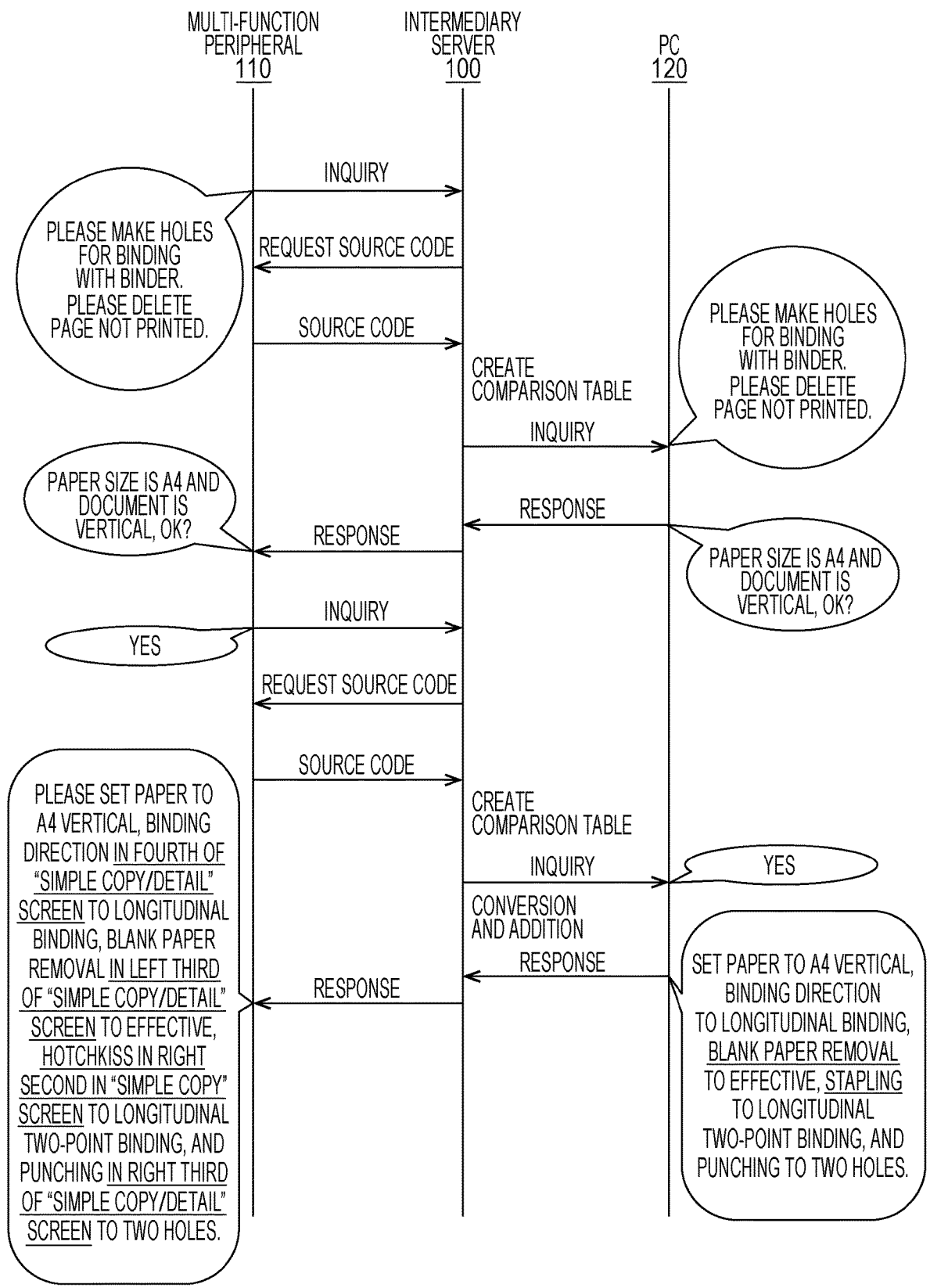
FIG. 18 is a sequence diagram illustrating another operation example of the message conversion system.

FIG. 18 is a sequence diagram illustrating another operation example of the message conversion system 1 according to this embodiment.

As illustrated in FIG. 18, when the user of the multi-function peripheral 110 presses the audio guide key 314 to input the inquiry audio of "Please make a hole for binding with binder. Please delete pages not printed." with the microphone 313, the intermediary server 100 which receives the inquiry audio obtains the source code from the multi-function peripheral 110, creates the comparison table, and tries to replace the inquiry audio. However, since the inquiry audio does not include the UI name, the intermediary server 100 transmits the inquiry audio as is to the PC 120 of the service center 122.

Note that, in this case, it is possible to temporarily convert the inquiry audio received from the multi-function peripheral 110 into the text data, and then synthesize the audio data from the text data to transmit to the PC 120, or transmit the inquiry audio received from the multi-function peripheral 110 as is to the PC 120 because the UI name to be replaced is not included therein.

When the CE of the service center 122 responds to this inquiry as "Paper size is A4 and document is vertical, OK?", the intermediary server 100 which receives the audio data of the response tries to replace the UI name with reference to the comparison table; however, since the response audio does not include the UI name, the intermediary server 100 transmits the response audio as is to the multi-function peripheral 110.

When the multi-function peripheral 110 receives the response audio data and reproduces to output the same, the user of the multi-function peripheral 110 audio-inputs "Yes", so that this is transmitted to the intermediary server 100 as the inquiry audio. Since this inquiry audio does not include the UI name to be replaced, too, the intermediary server 100 transmits the inquiry audio data to the PC 120.

In this case, in a case where it is determined that first inquiry audio and second inquiry audio from the user of the multi-function peripheral 110 are related to each other, such as when a time interval between the receptions by the intermediary server 100 is equal to or shorter than a predetermined time interval, the intermediary server 100 may omit the request of the source code from the multi-function peripheral 110 even when this receives the second inquiry audio and may continuously use the comparison table created when the first inquiry audio is received.

In this manner, it is possible to eliminate an unnecessary process of creating the same comparison table using the same source code, so that it is possible to reduce a processing load of the intermediary server 100 and the multi-function peripheral 110. Also, since a response time from when the user of the multi-function peripheral 110 makes the inquiry to when the CE of the service center 122 responds may be shortened, convenience for the user of the multi-function peripheral 110 may be improved.

When receiving the inquiry audio "Yes" from the user of the multi-function peripheral 110, the CE of the service center 122 audio-inputs the response of "Please set paper to A4 vertical, binding direction to longitudinal binding direction, blank paper removal to effective, stapling to longitudinal two-point stapling, and punching to two holes." and transmits the response audio data to the intermediary server 100.

The intermediary server 100 which receives the response audio data refers to the comparison table and replaces "stapling" and "blank paper removal" described in the "UI name" field of the "default screen" field with "Hotchkiss" and "blank paper removal" of the "UI name" field of the "customized screen" field. On the other hand, "binding direction" and "punching" are the same between the "UI name" field of the "default screen" field and the "UI name" field of the "customized screen" so that they are not replaced or do not change even when they are replaced.

After the replacement, "simple copy/detail" in the "screen name" field and "right fourth" in the "UI position" field of the "customized screen" field are added to "binding direction" described in the "UI name" field of the "customized screen" field to make "binding direction in right fourth of simple copy/detail screen".

As for "blank paper removal" described in the "UI name" field of the "customized screen" field, "simple copy/detail" in the "screen name" field and "in left third" in the "UI position" field of the "customized screen" field are added to make "white paper removal in left third of simple copy/detail screen".

As for "Hotchkiss" described in the "UI name" field of the "customized screen" field, "simple copy" in the "screen name" field and "in right second" in the "UI position" field of the "customized screen" field are added to make "Hotchkiss in right second of simple copy/detail screen".

As for "punching" described in the "UI name" field of the "customized screen" field, "simple copy/detail" in the "screen name" field and "in right third" in the "UI position" field of the "customized screen" field are added to make "punching in right third of simple copy/detail screen".

The intermediary server 100 transmits the response audio data replaced and added in this manner to the multi-function peripheral 110. The multi-function peripheral 110 which receives the response audio data reproduces and outputs the response audio.

As described above, although the inquiry audio and the response audio do not necessarily include the UI name, according to the message conversion system 1 according to this embodiment, it is possible to smoothly move the conversation between the user of the multi-function peripheral 110 and the CE of the service center 122 without interfering the same even in a case where the inquiry audio and the response audio do not include the UI name.

[7] Variation

Although the present invention is described above with reference to the embodiment, it goes without saying that the present invention is not limited to the above-described embodiment, and a following variation may also be implemented.

(7-1) In the above-described embodiment, a case where the CE of the service center 122 responds to the inquiry from the user of the multi-function peripheral 110 is described as an example, but it goes without saying that the present invention is not limited to this, and instead, the following case is also possible.

Figure 19:
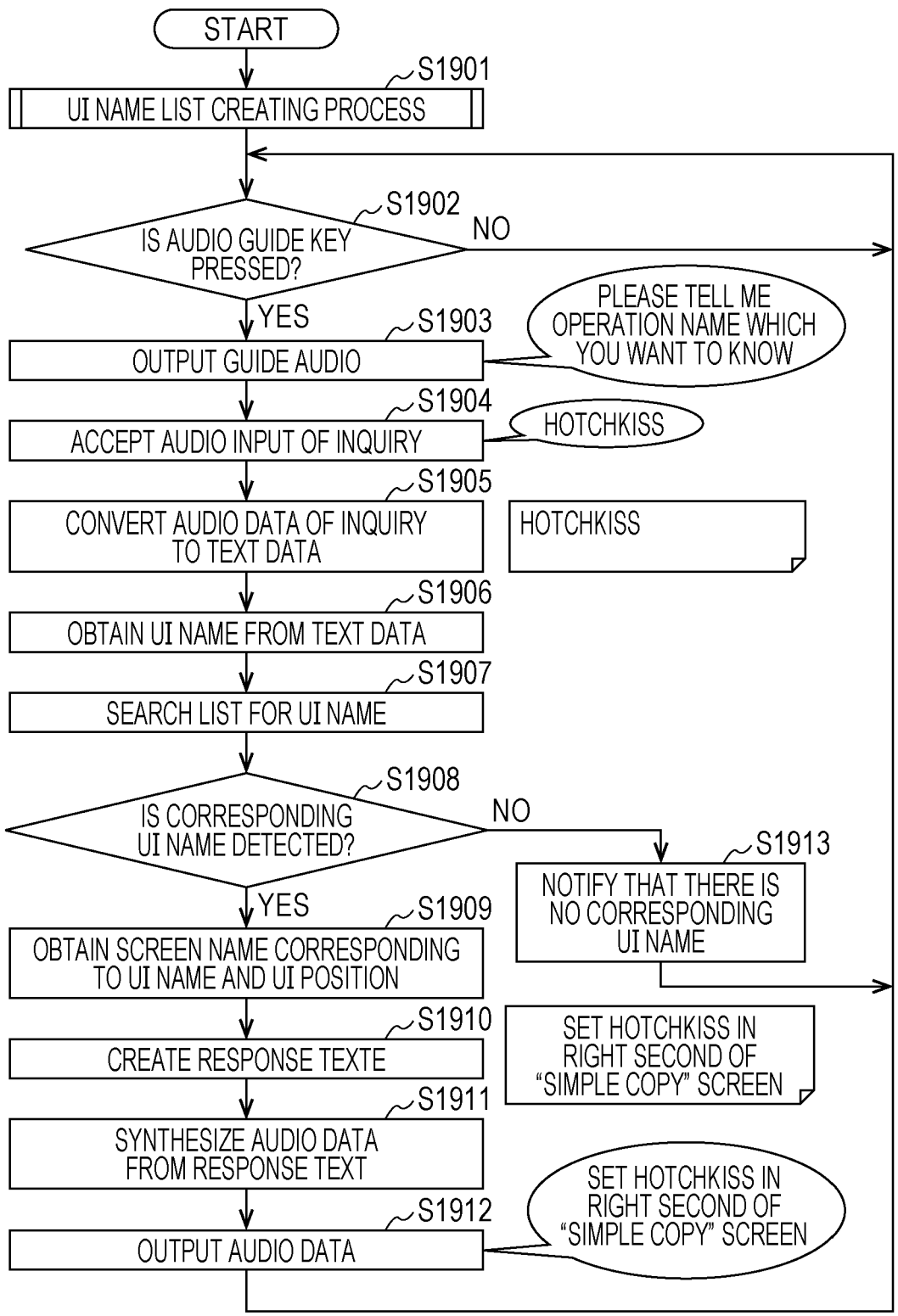
FIG. 19 is a flowchart illustrating principal operation of a multi-function peripheral according to a variation of the present invention.

For example, a multi-function peripheral 110 itself may respond to an inquiry of a user of the multi-function peripheral 110. As illustrated in FIG. 19, the multi-function peripheral 110 creates a list of UI names in advance (S1901), and when an audio guide key 314 is pressed (S1902: YES), the multi-function peripheral 110 outputs guide audio (S1903) and accepts an audio input of the inquiry from the user (S1904). The guide audio is, for example, "Tell me operation name which you want to know."

Next, the multi-function peripheral 110 converts the accepted inquiry audio into text data (S1905), and obtains the UI name from the obtained text data (S1906). For example, in a case where the inquiry audio "Hotchkiss" is accepted, the inquiry audio is converted into the text data, the text data is segmented, and it is confirmed whether a corresponding word is included in the UI name list (S1907). The UI name list is, for example, a table as illustrated in FIG. 14.

When the corresponding word is not included in the UI name list (S1908: NO), and it is notified that the corresponding UI name is not present by an audio output (S1913). The audio output is, for example, "The operation name of the inquiry is not supported."

In a case where the corresponding word is included in the UI name list (S1908: YES), a screen name and a UI position corresponding to the UI name are obtained (S1909), and a response text is created (S1910). For example, in a case where the UI name is "Hotchkiss", the screen name is "simple copy", and the UI position is "right second", the response text of "Please set Hotchkiss in right second of simple copy screen." is created.

Thereafter, the multi-function peripheral 110 synthesizes audio data from the response text (S1911), audio-outputs the obtained audio data from a speaker 312 (S1912), proceeds to step S1902, and stands by for a next inquiry.

Figure 20:
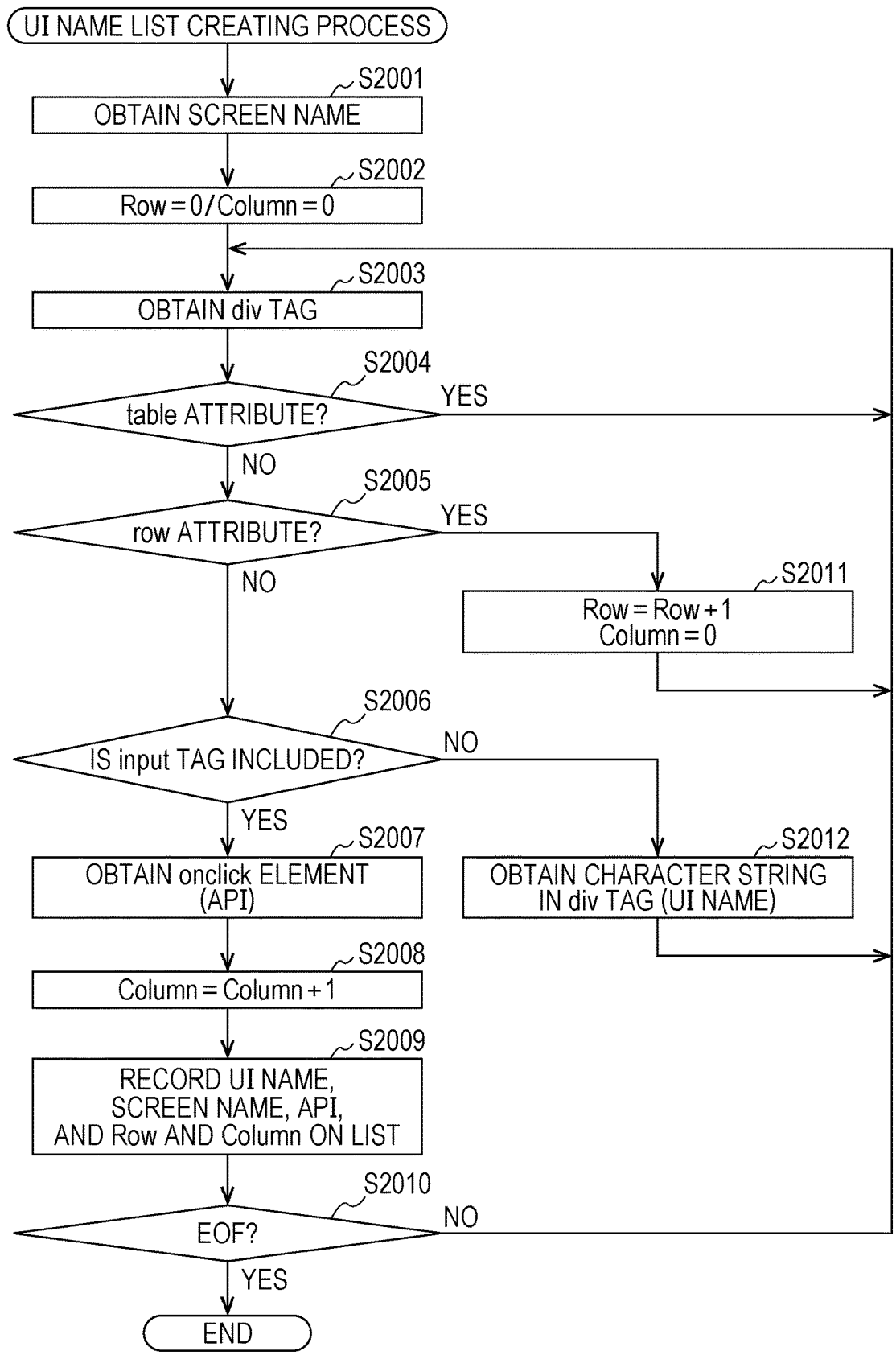
FIG. 20 is a flowchart illustrating a UI name list creating process executed by the multi function peripheral according to the variation of the present invention.

Note that, in a UI name list creating process at step S1901, as illustrated in FIG. 20, the multi-function peripheral 110 obtains a screen name for each source code as illustrated in FIG. 13 (S2001), initializes values of work variables Row and Column to 0, obtains a <div> tag (S2003), and in a case where the <div> tag has a table attribute (S2004: YES), returns to step S2003 and obtains a next <div> tag.

In a case where the <div> tag does not have the table attribute (S2004: NO) and has a row attribute (S2005: YES), the value of the work variable Row is incremented by one and the value of the work variable Column is set to 0 (S2011), and the next <div> tag is obtained (S2003). In a case where the <div> tag does not have the row attribute and does not include an <input> tag (S2006: NO), a character string in the <div> tag is obtained as the UI name (S2012), and the next <div> tag is obtained (S2003).

In a case where the <div> tag includes the <input> tag (S2006: YES), an onclick element is obtained as an API library function (S2007). This onclick element may be replaced with the API library function with reference to JavaScript (registered trademark) described in a <head> tag part at the beginning of the source code. Furthermore, the value of the work variable Column is incremented by one (S2008).

The UI name, the screen name, the API library function, and the UI position determined by the values of the work variables Row and Column obtained in this manner are recorded in the UI name list (S2009). Then, if it does not reach EOF (S2010: NO), the procedure shifts to step S2003 and the above-described processes are repeated. Also, if it reaches EOF (S2010: YES), the process of creating the UI name list relating to the source code is finished.

By doing so, user convenience may be improved because the multi-function peripheral 110 may respond quickly without contacting a CE of a service center 122 to the of a simple content. Note that, in a case where the multi-function peripheral 110 cannot respond, the inquiry audio may be transmitted to the CE of the service center 122 via the intermediary server 100 as in the above-described embodiment.

(7-2) In the above-described embodiment, a case where the intermediary server 100 requests the source code of the customized screen from the multi-function peripheral 110 from which the inquiry audio is transmitted is described as an example, but it goes without saying that the present invention is not limited to this, and instead, the following case is also possible.

For example, as described in the above-described variation, the multi-function peripheral 110 may create the UI name list in advance, and the intermediary server 100 may request the UI name list from the multi-function peripheral 110 instead of the source code of the customized screen. By doing so, a processing load of the intermediary server 100 may be prevented from increasing due to concentration of processes of obtaining the UI name, the screen name, the API library function, and the UI position from the source code of the customized screen on the intermediary server 100.

Therefore, since response time from when the multi-function peripheral 110 transmits the inquiry audio of the user to when the multi-function peripheral 110 receives the response audio by the CE of the service center 122 may be shortened, the user convenience may be improved.

Furthermore, in a case where the multi-function peripheral 110 holds the source code of the default screen, it is also possible that the multi-function peripheral 110 creates the comparison table in advance and the intermediary server 100 which receives the inquiry audio requests the comparison table from the multi-function peripheral 110. By doing so, it is not necessary for the intermediary server 100 to bear the processing load for creating the comparison table, so that a response performance of the message conversion system 1 may be further improved.

Also, the multi-function peripheral 110 may immediately register the source code of the customized screen on the intermediary server 100 when the operation screen is customized, and the intermediary server 100 which receives the registration may create the comparison table in advance prior to the reception of the inquiry audio. By doing so also, the response performance of the message conversion system 1 may be improved as compared to a case where the comparison table is created after receiving the inquiry audio.

(7-3) In the above-described embodiment, a case where the intermediary server 100, the multi-function peripheral 110, and the PC 120 transmit/receive the inquiry audio data and response audio data is described as an example, but it goes without saying that the present invention is not limited to this, and instead, the following case is also possible.

For example, the multi-function peripheral 110 may generate inquiry text data from the inquiry audio data by audio recognition processing and transmit the same to the intermediary server 100, the intermediary server may perform only a process of replacing the UI name and the like on the inquiry text data and transmit the inquiry text data after the process to the PC 120, and the PC 120 may synthesize the inquiry audio data from the inquiry text data (inquiry message) by audio synthesis processing and reproduce and output the same.

Similarly, the PC 120 may generate response text data from the response audio data by the audio recognition processing and transmit the same to the intermediary server 100, the intermediary server may perform replacement of the UI name and the like and an adding process of the UI position and the like to the response text data (response message) to transmit the response text data after the process to the multi-function peripheral 110, and the multi-function peripheral 110 may synthesize the response audio data from the response text data by the audio synthesis processing to reproduce and output the same.

By doing so, it is possible to prevent a load of the audio recognition processing and the audio synthesis processing from concentrating on the intermediary server, so that the response performance of the message conversion system 1 may be improved. Also, it is possible to reduce the load required for a communicating process for the intermediary server 100, the multi-function peripheral 110, and the PC 120 to transmit and receive the audio data, and the network load required for transmitting the audio data.

(7-4) In the above-described embodiment, although a case where the multi-function peripheral 110 instructs of the user operation by reproducing and outputting the response audio is described, as an example, it goes without saying that the present invention is not limited to this, and in addition to this, it is possible to emphasize the UI the operation of which is wanted by the user in addition to audio-output the same.

Figure 21A:
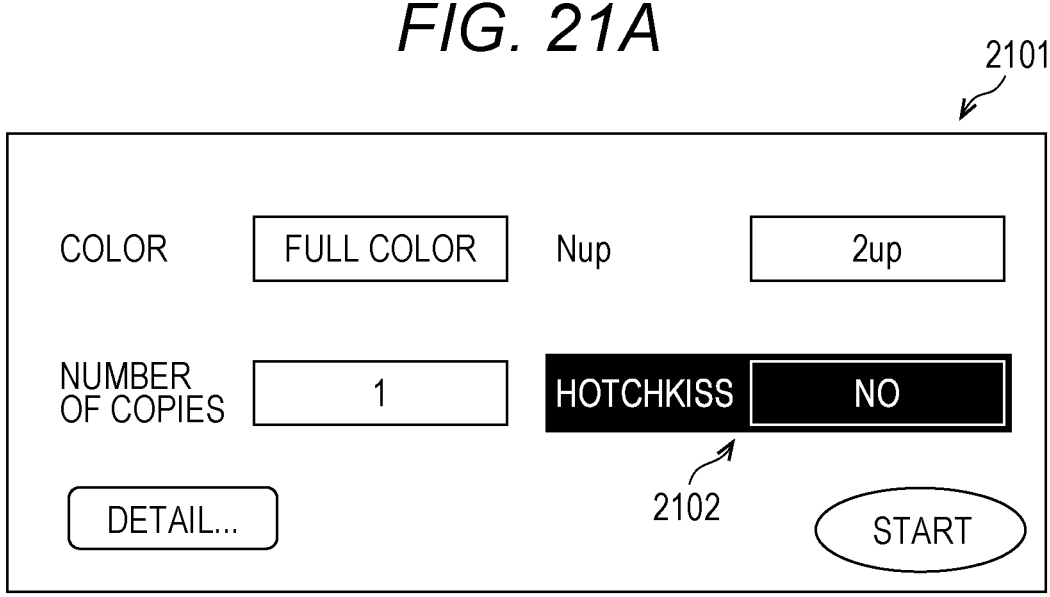
FIG. 21A is a view exemplifying an operation screen with emphasis.
Figure 21B:
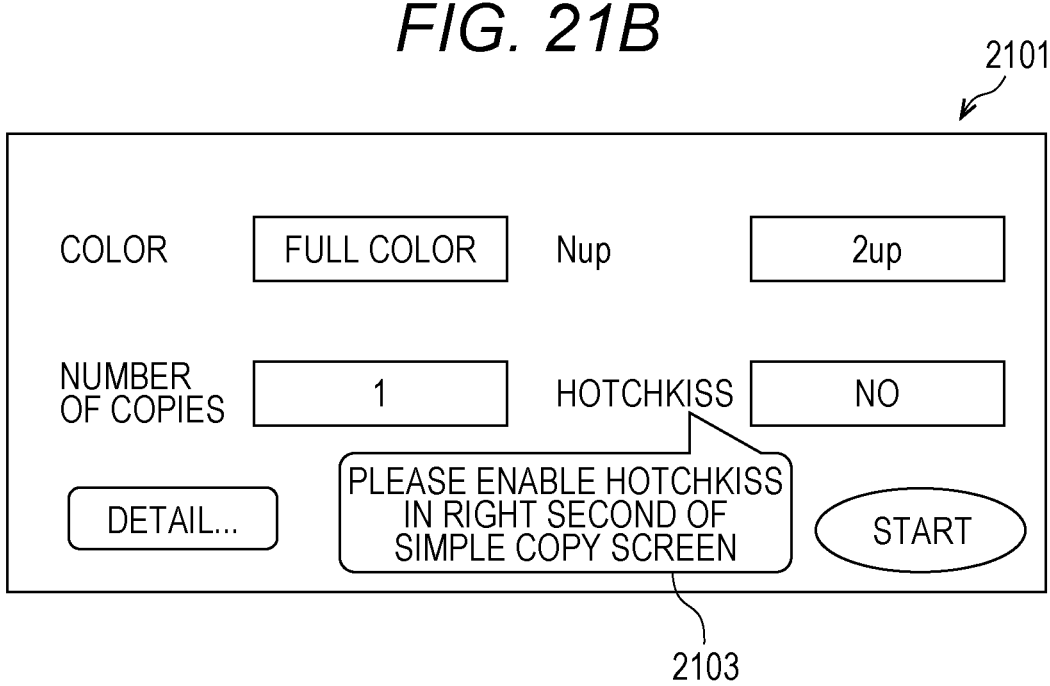
FIG. 21B is a view exemplifying an operation screen on which response text is displayed.

For example, in a case where the user wants to perform setting of Hotchkiss, as illustrated in FIGS. 21A and 21B, the UI name and the like of Hotchkiss may be emphasized by highlight 2102 on an operation screen 2101. In addition, a highlight frame may be displayed, a display color may be changed, or the display may blink. By doing so, the UI to be operated become more comprehensive, so that the user convenience may be improved.

Also, a response text 2103 may be displayed on the operation screen 2101. By doing so, even in a case where the user of the multi-function peripheral 110 misses the response audio or in a case where the response audio is hard to hear, it is possible to more surely transmit an operation method to the user.

(7-5) In the above-described embodiment, a case where the user of the multi-function peripheral 110 makes a next inquiry after the response audio from the CE of the service center 122 is reproduced and output is described as an example, but it goes without saying that the present invention is not limited to this, and the user of the multi-function peripheral 110 may audio-input the next inquiry without waiting for the response audio from the CE of the service center 122 to be reproduced and output. In this manner, according to the present invention, it is possible to make inquiries in a natural manner similar to that in normal telephone.

(7-6) In the above-described embodiment, although a case of generating the text data of the response by accepting the audio input of the response is described as an example, it goes without saying that the present invention is not limited to this, and it is also possible to generate the text data of the response by accepting a screen input to the default screen in place of the audio input.

For example, when the CE of the service center 122 places a mouse cursor of the mouse 908 on "stapling" of the copy screen which is the default screen and performs click operation, it is possible to generate the text data of the response by obtaining "stapling" as the UI name and specifying the API library function "API_Staple" corresponding to the UI name "stapling". The PC 120 transmits the text data of the response generated in this manner to the intermediary server 100.

In this manner, the similar effect may be obtained by generating the text data of the response.

Note that, with regard to the text data of the inquiry, the user of the multi-function peripheral 110 makes the inquiry because the user cannot know how to operate the screen, so that it is not possible to generate the text data of the inquiry by the screen input. Therefore, it is not necessary to provide a graphical user interface (GUI) for generating the text data of the inquiry by the screen input to the multi-function peripheral 110.

(7-7) In the above-described embodiment, a case where the multi-function peripheral 110 is installed in the office 112 is described as an example, but it goes without saying that the present invention is not limited, to this, and a single function device such as a printer device, a scanner device, a copying device, and a facsimile device may be installed in place of the multi-function peripheral 110. In addition, an information processing device other than the single function device may also be used as long as this is the information processing device which displays the operation screen and accepts the user operation. Even in a case where the information processing device is installed in place of the multi-function peripheral 110, the similar effect may be obtained by applying the present invention.

(7-8) Although the message conversion system 1 is described as an example in the above-described embodiment, it goes without saying that the present invention is not limited to this, and the present invention may also be a message conversion method executed by the message conversion system 1. This may also be a message conversion program which allows a computer to execute the message conversion method. In any case, the effect of the present invention is the same.

(7-9) Each device described above is a computer system in the sense that this is provided with a microprocessor and a memory. The memory stores a computer program, and the microprocessor operates according to the computer program.

Here, the computer program is configured by combining a plurality of instruction codes indicating instructions to the computer in order to achieve a predetermined function.

The computer program may also be recorded on a computer readable recording medium, for example, a flexible disk, a hard disk, an optical disk, a semiconductor memory and the like.

In addition, the computer program may be transmitted via a wireless or wired telecommunication line, a network represented by the Internet, data broadcasting and the like.

The message conversion system, the message conversion method, and the message conversion program according to the present invention are useful as a technology of converting messages exchanged regarding the customized operation screen so as to be easily understood.

According to an embodiment of the present invention, since the name of the operation item in the customized screen in the message is replaced with the name of the operation item in the default screen, the CE may understand the content of the inquiry message from the user without knowing the customized screen. In addition, since the name of the operation item in the default screen in the message is replaced with the name of the operation item in the customized screen, if the operation instruction using the default screen is transmitted as a message, it is possible to instruct the user of the operation instruction using the customized screen.

Although embodiments of the present invention have been described and illustrated in detail, the disclosed embodiments are made for purposes of illustration and example only and not limitation. The scope of the present invention should be interpreted by terms of the appended claims.

What is claimed is:

1. A message conversion system in which an operation screen displayed on an operation panel of an operated device is freely customized by a user, the message conversion system converting a message regarding one operation screen out of an operation screen after the customization and a default screen before the customization to a message regarding the other operation screen, the message conversion system comprising:
    a first obtainer that obtains, for each operation item present on the default screen, a name of the operation item and identification information of operation control to be performed on an operated device main body in a case where the operation item is operated;
    a second obtainer that obtains from the operated device, for each operation item present on the operation screen after the customization, a name of the operation item and identification information of operation control to be performed on the operated device main body in a case where the operation item is operated;
    a creator that creates a comparison table in which the name of the operation item on the default screen and the name of the operation item on the operation screen after the customization are associated with each other for each identification information of the operation control on the operated device main body; and
    a replacer that specifies the identification information of the operation control corresponding to the name of the operation item included in the message regarding one operation screen out of the operation screen after the customization and the default screen, and
    obtains the name of the operation item of the other operation screen corresponding to the specified identification information with reference to the comparison table and replaces the name of the operation item of the one operation screen included in the message with the name of the operation item of the other operation screen.

2. The message conversion system according to claim 1,
    wherein the identification information of the operation control is information that specifies an API library function for requesting the operated device to execute the operation control in a source code for displaying the operation screen on the operation panel.

3. The message conversion system according to claim 2,
    wherein a script for displaying the operation screen is described in HTML and JavaScript, and
    the first and second obtainer specify a character string designated by a value attribute in an input tag or a character string described immediately before the input tag as a name of an operation menu, and specify a JavaScript function designated by an onclick attribute of the input tag as the identification information of the operation control.

4. The message conversion system according to claim 2,
    wherein a script for displaying the operation screen is described in HTML and JavaScript, and
    the first and second obtainer specify a character string designated by a value attribute in an input tag or a character string described immediately before the input tag as a name of an operation menu, and specify the API library function used in a JavaScript function designated by an onclick attribute of the input tag as the identification information of the operation control.

5. The message conversion system according to claim 1,
    wherein the replacer accepts the message by an audio input.

6. The message conversion system according to claim 1,
    wherein the replacer generates the message from an operation instruction which is screen-input.

7. The message conversion system according to claim 1, comprising:
- a third obtainer that obtains, for each operation item present on the operation screen after the customization, position information of the item from the operated device; and
- an adder that adds the position information of the operation item to the name of the operation item on the operation screen after the customization in the message after the replacement by the replacer in a case of converting the message regarding the default screen to the message regarding the operation screen after the customization.

8. The message conversion system according to claim 7, comprising:
- an emphasizer that allows the operated device to emphasize a display content of the position indicated by the position information of the operation item corresponding to the name of the operation item of the operation screen after the customization in the message after the replacement by the replacer.

9. The message conversion system according to claim 1, comprising:
- an audio outputter that allows the operated device to audio-output the message after the replacement by the replacer.

10. The message conversion system according to claim 1, comprising:
- a text display that allows the operation screen of the operated device to display a text of the message after the replacement by the replacer.

11. The message conversion system according to claim 1, wherein the operated device is an image forming device.

12. A message conversion method in which an operation screen displayed on an operation panel of an operated device is freely customized by a user, the message conversion method converting a message regarding one operation screen out of an operation screen after the customization and a default screen before the customization to a message regarding the other operation screen, the message conversion method comprising:
- obtaining, for each operation item present on the default screen, a name of the operation item and identification information of operation control to be performed on an operated device main body in a case where the operation item is operated;
- obtaining from the operated device, for each operation item present on the operation screen after the customization, a name of the operation item and identification information of operation control to be performed on the operated device main body in a case where the operation item is operated;
- creating a comparison table in which the name of the operation item on the default screen and the name of the operation item on the operation screen after the customization are associated with each other for each identification information of the operation control on the operated device main body;
- specifying the identification information of the operation control corresponding to the name of the operation item included in the message regarding one operation screen out of the operation screen after the customization and the default screen; and
- obtaining the name of the operation item of the other operation screen corresponding to the specified identification information with reference to the comparison table and replacing the name of the operation item of the one operation screen included in the message with the name of the operation item of the other operation screen.

13. A non-transitory recording medium storing a computer readable message conversion program that allows a computer to execute a message conversion method in which an operation screen displayed on an operation panel of an operated device is freely customized by a user, the message conversion method converting a message regarding one operation screen out of an operation screen after the customization and a default screen before the customization to a message regarding the other operation screen, the message conversion program allowing a computer to execute:
- obtaining, for each operation item present on the default screen, a name of the operation item and identification information of operation control to be performed on an operated device main body in a case where the operation item is operated;
- obtaining from the operated device, for each operation item present on the operation screen after the customization, a name of the operation item and identification information of operation control to be performed on the operated device main body in a case where the operation item is operated;
- creating a comparison table in which the name of the operation item on the default screen and the name of the operation item on the operation screen after the customization are associated with each other for each identification information of the operation control on the operated device main body;
- specifying the identification information of the operation control corresponding to the name of the operation item included in the message regarding one operation screen out of the operation screen after the customization and the default screen; and
- obtaining the name of the operation item of the other operation screen corresponding to the specified identification information with reference to the comparison table and replacing the name of the operation item of the one operation screen included in the message with the name of the operation item of the other operation screen.

* * * * *